US008348437B2

(12) United States Patent
Watanabe et al.

(10) Patent No.: US 8,348,437 B2

(45) Date of Patent: Jan. 8, 2013

(54) DISCHARGE LAMP LIGHTING DEVICE AND IMAGE DISPLAY DEVICE THAT CONTROLS ELECTRIC POWER CONVERTER OUTPUT ON A HISTORICAL BASIS

(75) Inventors: Koji Watanabe, Kadoma (JP); Hirofumi Konishi, Hirakata (JP)

(73) Assignee: Panasonic Corporation, Osaka (JP)

( * ) Notice: Subject to any disclaimer, the term of this patent is extended or adjusted under 35 U.S.C. 154(b) by 376 days.

(21) Appl. No.: 12/446,825

(22) PCT Filed: Nov. 22, 2007

(86) PCT No.: PCT/JP2007/072641

§ 371 (c)(1),
(2), (4) Date: Apr. 23, 2009

(87) PCT Pub. No.: WO2008/078484

PCT Pub. Date: Jul. 3, 2008

(65) Prior Publication Data

US 2010/0033692 A1 Feb. 11, 2010

(30) Foreign Application Priority Data

Dec. 25, 2006 (JP) ................................ 2006-348538

(51) Int. Cl.
*G03B 21/20* (2006.01)

(52) U.S. Cl. ........................................................ 353/85

(58) Field of Classification Search .................... 353/85; 315/209 R, 219, 224, 246, 291, 37, 308

See application file for complete search history.

(56) References Cited

U.S. PATENT DOCUMENTS

| | | | | |
|---|---|---|---|---|
| 5,463,287 | A * | 10/1995 | Kurihara et al. .............. | 315/307 |
| 5,680,015 | A * | 10/1997 | Bernitz et al. ................ | 315/291 |
| 6,967,446 | B2 * | 11/2005 | Hamaguchi et al. .......... | 315/224 |
| 2004/0000880 | A1 | 1/2004 | Ozasa et al. | |

(Continued)

FOREIGN PATENT DOCUMENTS

JP 2003-86387 3/2003

(Continued)

OTHER PUBLICATIONS

English language Abstract of JP 2004-342465, Dec. 2, 2004.

(Continued)

*Primary Examiner* — Thanh Luu
*Assistant Examiner* — Renee Naphas
(74) *Attorney, Agent, or Firm* — Greenblum & Bernstein, P.L.C.

(57) ABSTRACT

A discharge lamp lighting device includes: a power converting circuit including a step-down chopper circuit and a polarity inversion circuit configured to convert an output from the step-down chopper circuit to a rectangular-wave alternating-current voltage, and thus to apply the rectangular-wave alternating-current voltage to a discharge lamp; and a memory configured to store a history of an output from the power converting circuit in a previous stable lighting mode. A control circuit controls on and off of each of switching elements in the step-down chopper circuit and the polarity inversion circuit, and thereby changes the output from the power converting circuit in a predetermined time period after the lamp starts lighting until reaching a stable lighting state on the basis of the history stored in the memory, so that a rise of a lamp voltage is suppressed. This enables extension of the lifespan of the lamp and suppression of the occurrence of arc jump.

5 Claims, 21 Drawing Sheets

U.S. PATENT DOCUMENTS

| | | | |
|---|---|---|---|
| 2005/0023993 A1 | 2/2005 | Ono et al. | |
| 2007/0210727 A1 | 9/2007 | Sun et al. | |
| 2008/0030143 A1 | 2/2008 | Goriki et al. | |
| 2008/0048586 A1 | 2/2008 | Hasegawa et al. | |
| 2008/0143270 A1 | 6/2008 | Sun et al. | |
| 2008/0157693 A1 | 7/2008 | Yamamoto et al. | |

FOREIGN PATENT DOCUMENTS

| | | |
|---|---|---|
| JP | 2004-342465 | 12/2004 |
| JP | 2005-32711 | 2/2005 |
| JP | 2005-197181 | 7/2005 |
| JP | 2005-353445 | 12/2005 |
| JP | 2006-147363 | 6/2006 |
| JP | 2006-156168 | 6/2006 |

OTHER PUBLICATIONS

English language Abstract of JP 2005-32711, Feb. 3, 2005.
English language Abstract of JP 2005-353445, Dec. 22, 2005.
English language Abstract of JP 2003-86387, Mar. 20, 2003.
English language Abstract of JP 2005-197181, Jul. 21, 2005.
English language Abstract of JP 2006-156168, Jun. 15, 2006.
English language Abstract of JP 2006-147363, Jun. 8, 2006.
Search report from E.P.O.. mail date is Sep. 8, 2011.
Japan Office action. dated Sep. 6, 2011.

* cited by examiner

41c

| BEFORE TURNING OFF $\xrightarrow{Pla}$ AFTER STARTING OPERATION | fa FOR PREDETERMINED TIME PERIOD AFTER STARTING OPERATION |
|---|---|
| Pf → Pf | ff1 |
| Pd → Pf | ff2 |
| Pf → Pd | fd1 |
| Pd → Pd | fd2 |

FIG. 6

41c

| Vla BEFORE TURNING OFF | fa FOR PREDETERMINED TIME PERIOD AFTER STARTING OPERATION | |
|---|---|---|
| | DURING FULL POWER | DURING DIMMING POWER |
| V1~V2 | ff1 | fd1 |
| V2~V3 | ff2 | fd2 |
| V3~V4 | ff3 | fd3 |
| • | • | • |
| • | • | • |
| • | • | • |
| • | • | • |
| Vn~Vn+1 | ffn | fdn |

41c

| Pla BEFORE TURNING OFF | Ila FOR PREDETERMINED TIME PERIOD AFTER STARTING OPERATION |
|---|---|
| Pf | I1 |
| Pd | I2 |

41c

| Vla BEFORE TURNING OFF | Ila FOR PREDETERMINED TIME PERIOD AFTER STARTING OPERATION | |
|---|---|---|
| | DURING FULL POWER | DURING DIMMING POWER |
| V1~V2 | If1 | Id1 |
| V2~V3 | If2 | Id2 |
| V3~V4 | If3 | Id3 |
| . | . | . |
| . | . | . |
| . | . | . |
| . | . | . |
| Vn~Vn+1 | Ifn | Idn |

41c

| fa BEFORE TURNING OFF | Ila FOR PREDETERMINED TIME PERIOD AFTER STARTING OPERATION | |
|---|---|---|
| | DURING FULL POWER | DURING DIMMING POWER |
| f1~f2 | If1 | Id1 |
| f2~f3 | If2 | Id2 |
| f3~f4 | If3 | Id3 |
| . | . | . |
| . | . | . |
| . | . | . |
| . | . | . |
| fn~fn+1 | Ifn | Idn |

DISCHARGE LAMP LIGHTING DEVICE AND IMAGE DISPLAY DEVICE THAT CONTROLS ELECTRIC POWER CONVERTER OUTPUT ON A HISTORICAL BASIS

TECHNICAL FIELD

The present invention relates to a discharge lamp lighting device and an image display apparatus using the same.

There are discharge lamp lighting devices configured to light high-intensity high-pressure discharge lamps employed in image display apparatuses such as projectors and rear-projection television sets. In recent years, in some of such discharge lamp lighting devices, the operating frequency of the lamp is made variable (see Patent Documents 1 and 2, for example), or the electric current of the lamp is made variable (see Patent Document 3 and 4, for example), as control after the device starts lighting, for the purpose of suppressing arc jump, raising the light emission amount quickly, and extending the lifespan of the lamp.

Parts (a) to (C) of FIG. 25 show a control of an output to the lamp generally implemented after the lamp starts lighting until reaching a stable lighting state. Until the lamp voltage Vla reaches a predetermined voltage, a constant current control is performed in order that the lamp current Ila should not exceed a current limit I0. Once the lamp voltage Vla reaches the predetermined voltage, the device shifts to a constant power control to control the lamp power Vla at a constant level.

In addition, the lamp has an operating frequency fa higher in a dim light (Dim light) mode than in a rated light (full light) mode. Once a certain length of time passes after the shift to the constant power control, the lamp turns into a stable light mode where the lamp voltage Vla and the lamp current Ila and the like remain stable.

Patent Document 1: Japanese Patent Application Publication No. 2005-197181

Patent Document 2: Japanese Patent Application Publication No. 2006-156168

Patent Document 3: Japanese Patent Application Publication No. 2005-32711

Patent Document 4: Japanese Patent Application Publication No. 2006-147363

When the discharge lamp lighting device starts to light the lamp, however, the lamp voltage Vla sometimes rises to a large extent because no consideration is given to the status of the electrodes of the lamp in the previous stable lighting mode. For example, when a discharge lamp having a rated power of 300 W is lighted with an operating frequency of 120 Hz (300 W) during a stable light mode, the next time the lamp is lighted with an operating frequency of 90 Hz (300 W) which is lower than the operating frequency in the previous stable light mode, the lamp voltage Vla becomes higher during a subsequent stable light mode than during the previous stable light mode. Furthermore, in a case where the lamp has been dimmed with a power of 250 W during a stable light mode and the next time the lamp is lighted with the rated power of 300 W, the lamp voltage Vla becomes higher during a subsequent stable light mode.

As described above, a phenomenon in which the lamp voltage Vla becomes higher after the lamp starts lighting until reaching a stable lighting state occurs depending on the lighting conditions of the lamp during a previous stable light mode. The phenomenon in which the lamp voltage Vla becomes higher is undesirable. An ultra-high pressure mercury lamp used for an image display apparatus such as a projector and a rear-projection television set has a tendency that its lamp voltage Vla increases as the period of use becomes longer from the onset of use toward the terminal phase of the lifespan. For preventing the lamp from bursting in the terminal phase of the lifespan, the discharge lamp lighting device performs such a control that the lamp is not lighted when the lamp voltage Vla reaches a predetermined voltage. As a result, the raised lamp voltage Vla decreases the time length for which the lamp can be used.

The discharge lamp lighting device performs a constant power control while lighting its discharge lamp with a voltage closer to the rated voltage of the lamp. As a result, once the lamp voltage Vla increases, the lamp current Ila decreases. Once the lamp current Ila decreases, the temperatures of the electrodes decrease. Accordingly, arc jump is highly likely to occur.

Against the above-described background, the present invention has been made. An object of the present invention is to provide a discharge lamp lighting device and an image display apparatus which are made capable of suppressing the rise of a lamp voltage after a lamp starts to be lighted until the lamp becomes lighted stably, with a history of lighting conditions of the previous stable lighting taken into consideration, and thus of extending the lifespan of the lamp, as well as hence of suppressing the occurrence of arc jump.

DISCLOSURE OF THE INVENTION

For achieving the above-described object, a discharge lamp lighting device according to the present invention includes: an electric power converting circuit configured to supply an alternating-current power to a discharge lamp by turning a switching element on and off; a control circuit configured to control an output from the electric power converting circuit by controlling the on and off of the switching element of the electric power converting circuit, and thus to shift the output control from a current limit region to a constant electric power control region after the discharge lamp starts to be lighted, the current limit region being that in which a lamp current is controlled in order not to exceed a current limit, and the constant electric power control region being that in which a lamp electric power is controlled in order to remain constant; and storage means for storing a history of the output from the electric power converting circuit in a previous stable lighting mode in the discharge lamp, wherein, on the basis of the history stored in the storage means, the control circuit suppresses a rise of a lamp voltage by changing the output from the electric power converting circuit in a predetermined time period after the discharge lamp starts to be lighted until the discharge lamp becomes lighted stably.

DESCRIPTION OF THE DRAWINGS

FIG. 6 is a diagram showing a configuration of a data table according to the second configuration of Embodiment 1.

BEST MODES FOR CARRYING OUT THE INVENTION

Embodiment 1

Figure 1:
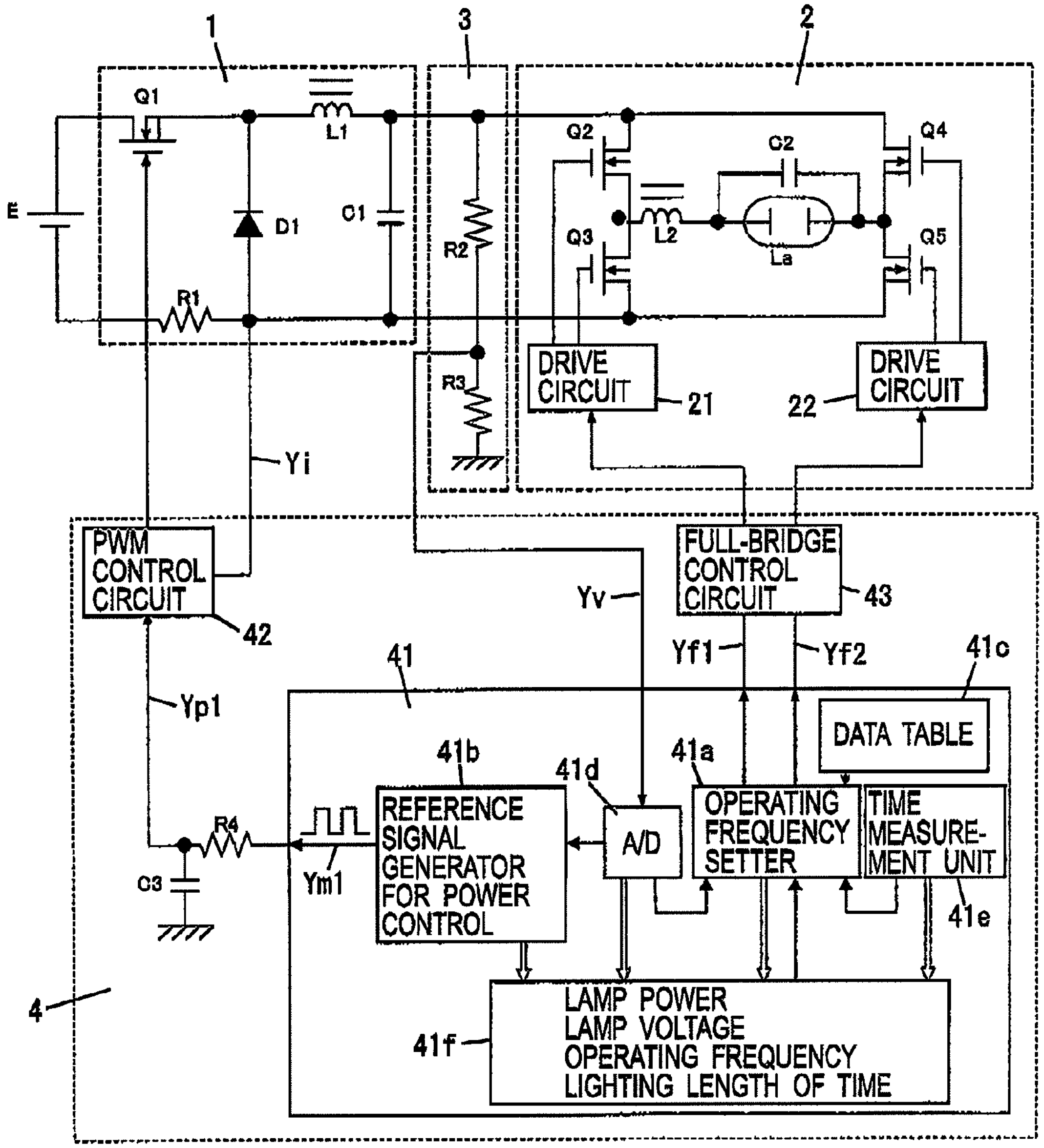
FIG. 1 is a diagram showing a configuration of a discharge lamp lighting device according to Embodiment 1.

FIG. 1 shows a circuit diagram of a discharge lamp lighting device according to the present embodiment. The discharge lamp lighting device includes a power converting circuit configured by including: a step-down chopper circuit 1 using a direct-current power supply E as its power source; and a polarity inversion circuit 2 configured to convert a direct-current voltage outputted from the step-down chopper circuit 1, to a rectangular-wave alternating voltage, and thus to apply the rectangular-wave alternating voltage to a discharge lamp La. The discharge lamp lighting device further includes: a lamp voltage detection circuit 3 configured to detect a lamp voltage Vla of the discharge lamp La; and a control circuit 4 configured to control the on and off of each of switching elements Q1 to Q5 provided in the power converting circuit.

In the step-down chopper circuit 1, the positive electrode of the direct-current power supply E is connected to the positive electrode of the capacitor C1 through the switching element Q1 and an inductor L1, whereas the negative electrode of the capacitor C1 is connected to the negative electrode of the direct-current power supply E through a resistor R1 for detecting an electric current detection. A diode D1 for supplying a regenerated current is connected to the two electrodes of the capacitor C1 through the inductor L1.

The switching element Q1 is driven on and off with a high frequency by an output from a PWM control circuit 42 provided in the control circuit 4. When the switching element Q1 is on, a chopper current flows from the direct-current power supply E through the switching element Q1, the inductor L1, the capacitor C1 and the resistor R1. The resistor R1 outputs a voltage across the resistor R1 as a current detection signal Y1. The voltage across the resistor is proportional to this chopper current. On the basis of the current detection signal Y1, the PWM control circuit 42 controls the switching element Q1 in order that the switching element Q1 should be turned off once the chopper current exceeds a predetermined value. When the switching element Q1 is off, the regenerated current flows via the inductor L1, the capacitor C1, and the diode D1. Through this operation, the capacitor C1 is charged with the direct-current voltage obtained by stepping down the output from the direct-current power supply E. In addition, when the on-duty (the ratio of the on-time to the time required for one cycle of on/off switching operation) of the switching element Q1 is made variable by the PWM control circuit 42, the charging voltage applied to the capacitor C1 can be controlled. Note that the direct-current power supply E may be, for example, an output obtained by rectifying and smoothing a commercial power supply, or an output from a boosting chopper circuit which boosts a full-wave rectified voltage of the commercial power supply. The polarity inversion circuit 2 is configured as an inverter circuit of a full-bridge type including: a series circuit including the switching elements Q2, Q3, the series circuit being connected to the two electrodes of the capacitor C1 in parallel; a series circuit including the switching elements Q4, Q5, the series circuit being connected to the two electrodes of the capacitor C1 in parallel; a drive circuit 21 configured to drive on and off the switching elements Q2, Q3 alternately; and a drive circuit 22 configured to drive on and off the switching elements Q4, Q5 alternately. A series circuit including an inductor L2 and a capacitor C2 is connected to a contact between the switching elements Q2, Q3 and a contact between the switching elements Q4, Q5. In this respect, the inductor L2 and the capacitor C2 constitutes a resonance circuit. The discharge lamp La is connected to the two electrodes of the capacitor C2.

According to a full-bridge control circuit 43 provided in the control circuit 4, the drive circuit 21 drives the switching elements Q2 to Q5 in a way that the following two switching states should be alternately repeated: the switching elements Q2, Q5 are on while the switching elements Q3, Q4 are off; and the switching elements Q2, Q5 are off while the switching elements Q3, Q4 are on. Thereby, the drive circuits 21, 22 apply the rectangular-wave alternating voltage to the discharge lamp La.

When starting an operation for lighting the discharge lamp La, the switching elements Q2 to Q5 repeat switching on and off with a higher frequency (of 1 KHz or more for 10 seconds or less), and thereby a resonating effect occurs between the inductor L2 and the capacitor C2. Through this resonating effect, a high-frequency high voltage is applied to the discharge lamp La, where a dielectric breakdown occurs. Concurrently, energy used to shift the discharge lamp La from a glow discharge to an arc discharge is applied to the discharge lamp La. The starting operation may be configured so that the high voltage should be applied to the discharge lamp La by use of an igniter circuit separately provided. Once the discharge lamp La starts to be lighted, the switching elements Q2 to Q5 repeat switching on and off with a lower frequency (of 1 KHz or less), and thus the voltage of the capacitor C1 alternately repeats its polarity inversion. Consequently, the resultant voltage is applied to the discharge lamp La.

The lamp voltage detection circuit 3 includes a series circuit including a resistor R2, R3, and this series circuit is configured to divide the voltage of the capacitor C1 into two parts. A voltage across the resistor R3 is outputted as a lamp voltage detection signal Yv.

The control circuit 4 is configured to monitor the chopper current and the lamp voltage on the basis of the current detection signal Yi and the lamp voltage detection signal Yv, and thus to output a control signal for controlling the on and off of each of the switching elements Q1 to Q5. To this end, the control circuit 4 includes: a microcomputer 41 (hereinafter referred to as a "micon 41," and, for example, an R8C/11 microcontroller manufactured by Renesas Technology Corporation being used as the micon 41) configured to control the operation of the control circuit 4; the PWM control circuit 42 configured to control the operation of the switching element Q1 in the step-down chopper circuit 1 on the basis of instructions from the micon 41; and the full-bridge control circuit 43 configured to control the operations of the respective switching elements Q2 to Q5 in the polarity inversion circuit 2 on the basis of instructions from the micon 41.

The micon 41 includes an operating frequency setter 41*a*, a reference signal generator 41*b* for power control, a data table 41*c*, an A/D converter 41*d*, a time measurement unit 41*e*, and a memory 41*f*. The A/D converter 41*d* is configured to convert the lamp voltage detection signal Yv from the lamp voltage detection circuit 3 to a digital signal, and thus to output the resultant digital signal to the operating frequency setter 41*a*, the reference signal generator 41*b* for power control, and the memory 41*f*.

The operating frequency setter 41*a* determines switching frequencies (operating frequencies) of the respective switching elements Q2 to Q5 in the polarity inversion circuit 2 on the basis of the lamp voltage detection signal Yv, sets of data which are stored in the data table 41*c* and the memory 41*f*, and the time measured by the time measurement unit 41*e*. Thus, the operating frequency setter 41*a* outputs inverter control signals Yf1, Yf2 corresponding to the determined switching frequencies, to the full-bridge control circuit 43. The full-bridge control circuit 43 controls the drive circuits 21, 22 in order that the switching elements Q2 to Q5 in the polarity inversion circuit 2 should be driven on and off with their respective switching frequencies instructed by the inverter control signals Yf1, Yf2.

The reference signal generator 41*b* for power control outputs a PWM signal Ym1 on the basis of the lamp voltage detection signal Yv. The PWM signal Ym1 has a duty which is set up in order that the root-mean-square value Ila of the lamp current (hereinafter referred to as a "lamp current Ila) should be equal to a desired value. The PWM signal Ym1 is smoothed by a filter circuit including a resistor R4 and a capacitor C3. Thus, as a chopper controlling reference signal Yp1, a direct-current voltage thus obtained is inputted into the PWM control circuit 42. Subsequently, on the basis of the chopper controlling reference signal Yp1 and the current detection signal Yi, the PWM control circuit 42 drives on and off the switching element Q1 in the step-down chopper circuit 1. Note that the chopper controlling reference signal Yp1 may be generated by and outputted from the micon 41 if the micon 41 includes an A/D conversion function.

When starting the operation for lighting the discharge lamp La (when the switching elements Q2 to Q5 operate with their respective high frequencies), the reference signal generator 41*b* for power control causes dielectric breakdown in the discharge lamp La. After the dielectric breakdown, the reference signal generator 41*b* for power control sets the voltage of the capacitor C1 at a voltage which enables a predetermined high-frequency current to be supplied to the discharge lamp La. Once the discharge lamp La starts to be lighted (when the switching elements Q2 to Q5 operate with their respective low frequencies), the reference signal generator 41*b* for power control optimizes the voltage of the capacitor C1 in order that the lamp current Ila takes on a desired waveform.

Next, descriptions will be provided for how the control circuit 4 controls the lamp voltage Vla in order to suppress the rise of the lamp voltage Vla after the lamp starts lighting until reaching a stable lighting state. First of all, when the discharge lamp La having been stably lighted is turned off, the following set of data is stored in the memory 41*f* such as a flash memory or an EEPROM. The set of data includes: the lamp power Pla, the lamp voltage Vla and the operating frequency fa with which the discharge lamp La is lighted immediately before the discharge lamp La is turned off; and the lighting time length Ta for which the discharge lamp La is lighted under these conditions. Furthermore, in a case where the lamp power Pla, the lamp voltage Vla and the operating frequency fa are changed while the discharge lamp La is lighted stably, the lighting conditions before the change are stored in the memory 41*f*. As described here, a history of the lighting conditions with which the discharge lamp La is lighted stably is stored in the memory 41*f*. Note that the memory 41*f* may be built in the micon 41, or may be an external device connected to the micon 41.

The control circuit 4 controls the output to the lamp after the lamp starts lighting until reaching a stable lighting state as follows. Until the lamp voltage Vla reaches a predetermined voltage, the control circuit 4 performs a constant current control in order that the lamp voltage Vla should not exceed a current limit I0. Once the lamp voltage Vla reaches the predetermined voltage, the control circuit 4 shifts to a constant power control process in which the lamp power Pla is controlled in order to remain constant. In the present embodiment, for a predetermined time period after the lamp starts lighting until reaching a stable lighting state, the operating frequency setter 41*a* makes the operating frequency fa higher than an operating frequency in the previous stable lighting mode on the basis of the lighting conditions in the previous stable lighting mode, and the lighting conditions are stored in the memory 41*f*. To this end, a time period when the operating frequency La is raised is provided before the lamp becomes lighted stably, so that the rise of the lamp voltage Vla is suppressed. Descriptions will be hereinbelow provided for first to third configurations each enabling this operation. Note that the above-described predetermined period includes at least part of the constant current control region.

(First Configuration)

Figures 2, 3:
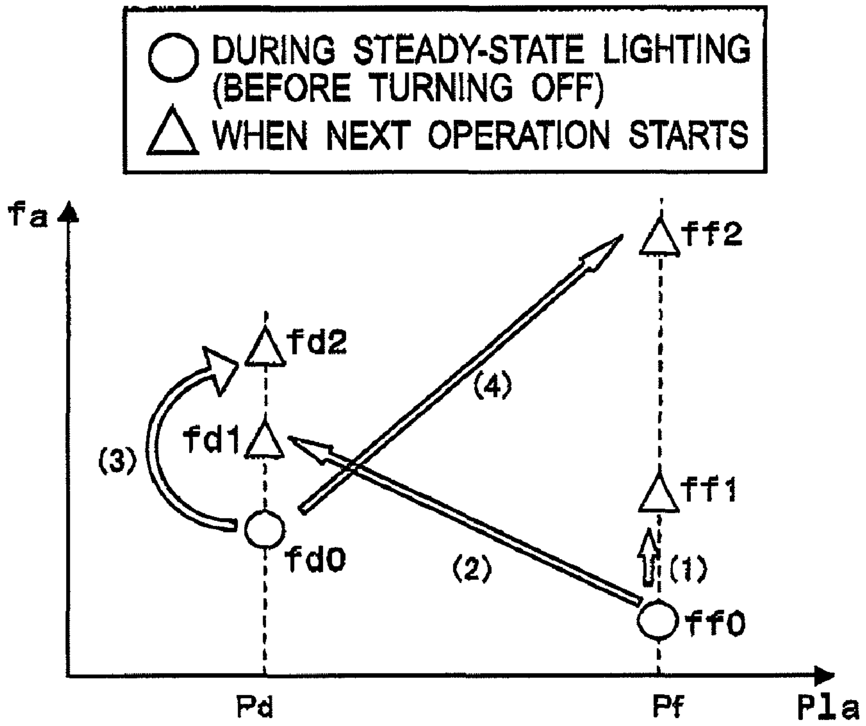
FIG. 2 is a diagram showing a configuration of a data table according to a first configuration of Embodiment 1.
FIG. 3 is a diagram showing transitions of an operating frequency according to the first configuration of Embodiment 1.

In the first configuration, as shown in FIG. 2, the data table 41*c* beforehand stores operating frequencies ff1, ff2, fd1, fd2 with one of which the lamp should be lighted for the predetermined time period after the lamp starts lighting until reaching a stable lighting state. In this respect, the operating frequencies ff1, ff2, fd1, fd2 correspond to patterns of change from lamp powers Pla in the previous stable lighting mode (before the lamp is turned off) to lamp powers Pla in this-time lighting start mode. Referring to this data table 41*c*, the operating frequency setter 41*a* sets an operating frequency fa for the predetermined time period. Thus, the operating frequency setter 41*a* makes one of the following controls (1) to (4) (see FIG. 3). Assume the operating frequency fa=ff0 if the lighting power Pla=the rated power Pf in the previous stable lighting mode, and the operating frequency fa=fd0 if the lighting power Pla=a dimming power Pd in the previous stable lighting mode (where Pf>Pd).

(1) In a case of the lamp power Pla=the rated power Pf in the previous stable lighting mode whereas the lamp power Pla=the rated power Pf in this-time lighting start mode, the operating frequency setter 41*a* increases the operating frequency fa so as to satisfy the operating frequency fa=ff1 (where ff1>ff0) for the predetermined time period after the lamp starts lighting until reaching a stable lighting state, and thereby makes the operating frequency fa temporarily higher than for the rest of the period after the lamp starts lighting until reaching a stable lighting state.

(2) In a case of the lamp power Pla=the rated power Pf in the previous stable lighting mode whereas the lamp power Pla the dimming power Pd in this-time lighting start mode, the operating frequency setter 41*a* increases the operating frequency fa so as to satisfy the operating frequency fa=fd1 (where fd1>ff0) for the predetermined time period after the lamp starts lighting until reaching a stable lighting state, and thereby makes the operating frequency fa temporarily higher than for the rest of the period after the lamp starts lighting until reaching a stable lighting state.

(3) In a case of the lamp power Pla=the dimming power Pd in the previous stable lighting mode whereas the lamp power Pla=the dimming power Pd in this-time lighting start mode, the operating frequency setter 41*a* increases the operating frequency fa so as to satisfy the operating frequency fa=fd2 (where fd2>fd0) for the predetermined time period after the lamp starts lighting until reaching a stable lighting state, and thereby makes the operating frequency fa temporarily higher than for the rest of the period after the lamp starts lighting until reaching a stable lighting state.

(4) In a case of the lamp power Pla=the dimming power Pd in the previous stable lighting mode whereas the lamp power Pla=the rated power Pf in this-time lighting start mode, the operating frequency setter 41*a* increases the operating frequency fa so as to satisfy the operating frequency fa=ff2 (where ff2>fd0) for the predetermined time period after the lamp starts lighting until reaching a stable lighting state, and thereby makes the operating frequency fa temporarily higher than for the rest of the period after the lamp starts lighting until reaching a stable lighting state.

The frequencies ff1, ff2, fd1, fd2 as shown in FIG. 3 need not be set different from one another, but may be appropriately set to a frequency at which a rise of the lamp voltage Vla is suppressed. In the present embodiment, the power is switched between the two steps consisting of the rated power Pf and the dimming power Pd. However, in cases of dimming in multi-step of three steps or more, and continuous dimming, the operating frequency for the predetermined time period may be set up in such a way so as to correspond to a pattern of change from a lamp power Pla in the previous stable lighting mode to a lamp power Pla in this-time lighting start mode.

(Second Configuration)

Figure 4:
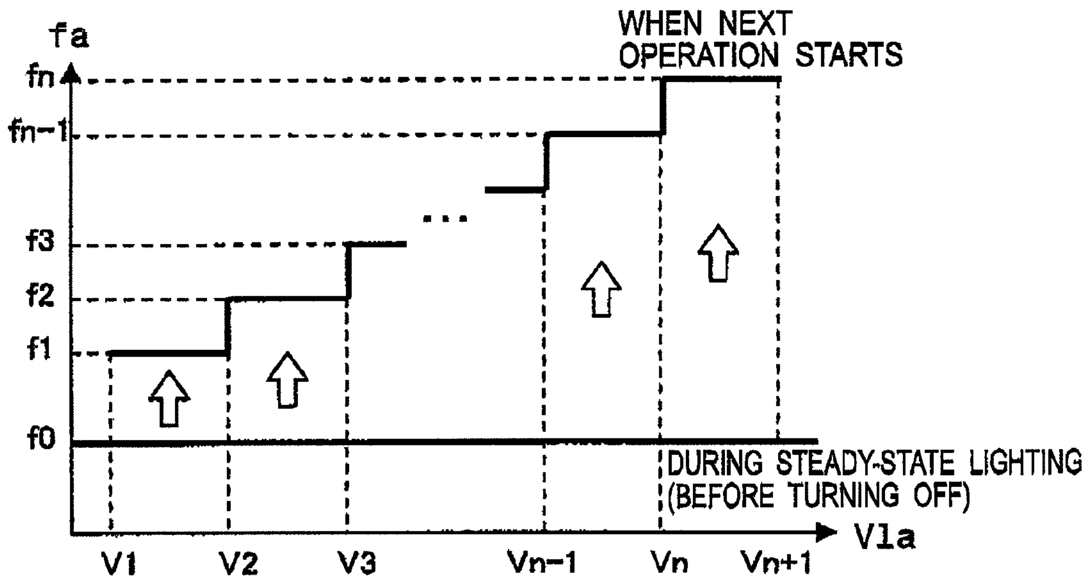
FIG. 4 is a diagram showing how to set up an operating frequency according to a second configuration of Embodiment 1.
Figure 5:
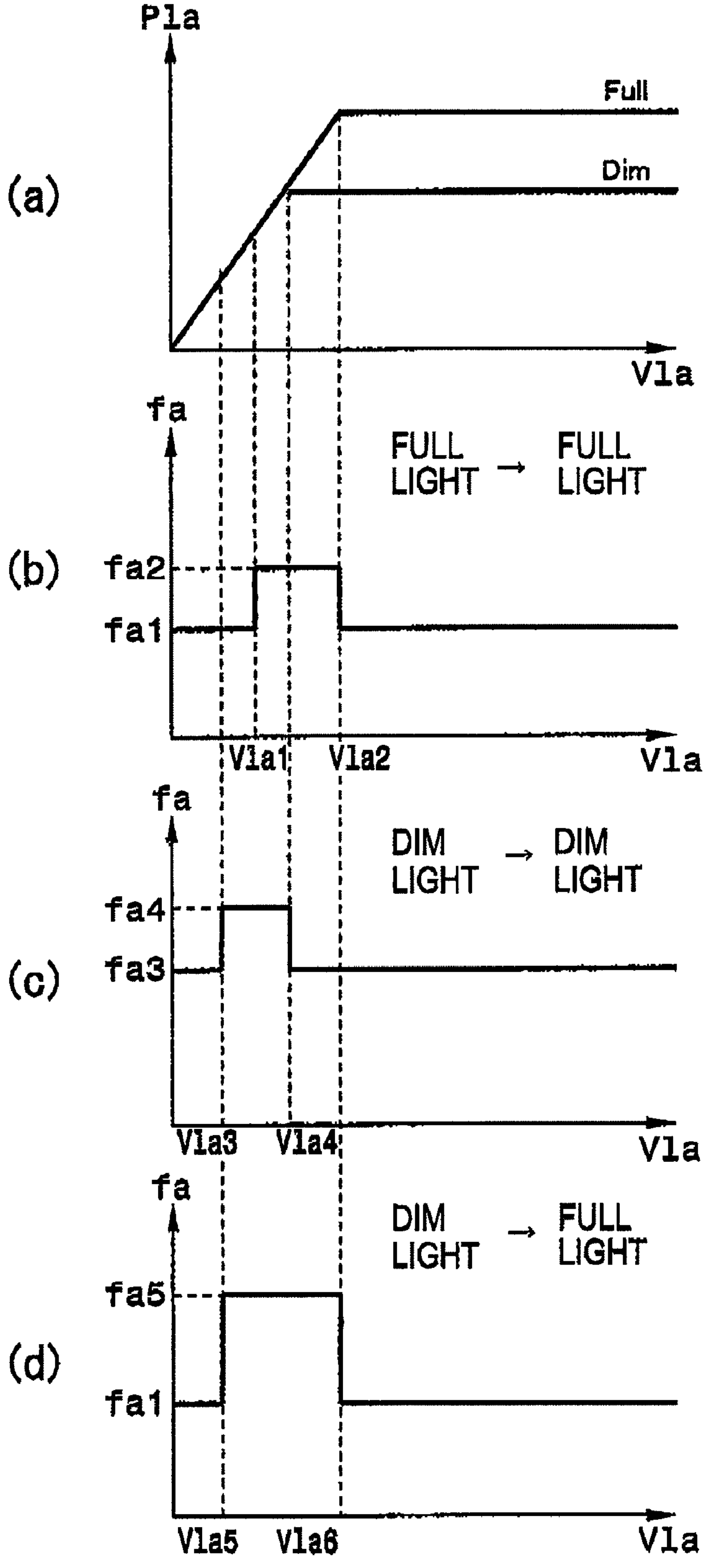
FIG. 5 Parts (a) to (d) of FIG. 5 are diagrams showing how to control an operating frequency according to the second configuration of Embodiment 1.

In the second configuration, an operating frequency fa with which the lamp is lighted for a predetermined time period is set up within the period after the lamp starts lighting until reaching a stable lighting state on the basis of a lamp voltage Vla in the previous stable lighting mode; and the predetermined time period is setup on the basis of the lamp voltage Vla. FIGS. 4 and 5 show how this operation works.

As shown in FIG. 6, the data table 41*c* beforehand stores operating frequencies f1 to fn respectively corresponding to n steps (V1 to V2, V2 to V3, . . . , Vn to Vn+1) of lamp voltages Vla in the previous stable lighting mode (before the lamp is turned off), the n steps obtained by dividing the lamp voltages on the basis of the degree thereof. The operating frequencies f1 to fn are further divided into: operating frequencies ff1 to ffn in a case of the lighting power Pla=the rated power Pf in this-time lighting start mode; and operating frequencies fd1 to fdn in a case of the lighting power Pla=the dimming power Pd in this-time lighting start mode.

Referring to the data table 41*c*, the operating frequency setter 41*a* selects the operating frequency fa for the predetermined time period out of the operating frequencies f1 to fn corresponding to the lamp voltage Vla in the previous stable lighting mode. As shown in FIG. 4, these operating frequencies f1 to fn are set up so as to be higher than an operating frequency f0 in the previous stable lighting mode. In addition, spans of the respective n divisional steps of the lamp voltage Vla may be set up each time the A/D converter 41*d* outputs one bit of its digital signal, or several bits to several hundred bits of its digital signal.

Referring to this data table 41*c*, the operating frequency setter 41*a* performs one of the following controls (1) to (4) (see FIG. 5). Note that Part (a) of FIG. 5 shows a relationship between the lamp voltage Vla and the lamp power Pla with respect to the rated light mode (full light mode) and the dim light mode (Dim light mode), and shows that the lamp voltage Vla rises after the lighting start so that the discharge lamp lighting device shifts from a constant current control to a constant power control at a predetermined voltage.

(1) In a case of the lamp power Pla=the rated power Pf in the previous stable lighting mode whereas the lamp power Pla=the rated power Pf in this-time lighting start mode, the operating frequency setter 41*a* refers to the data table 41*c*, and thus selects an operating frequency fa2 on the basis of the lamp voltage Vla in the previous stable lighting mode. Hence, as shown in Part (b) of FIG. 5, the operating frequency setter 41*a* sets the operating frequency fa: at an operating frequency fa1 in this-time stable lighting mode; and then at the operating frequency fa2 higher than the operating frequency fa1 during a time period when the lamp voltage Vla=Vla1 to Vla2 while the lamp voltage Vla is rising after the lighting start.

(2) In a case of the lamp power Pla=the dimming power Pd in the previous stable lighting mode whereas the lamp power Pla=the dimming power Pd in this-time lighting start mode, the operating frequency setter 41*a* refers to the data table 41*c*, and thus selects an operating frequency fa4 on the basis of the lamp voltage Vla in the previous stable lighting mode. Hence, as shown in Part (c) of FIG. 5, the operating frequency setter 41*a* sets the operating frequency fa: at an operating frequency fa3 in this-time stable lighting mode; and then at the operating frequency fa4 higher than the operating frequency fa3 during a time period when the lamp voltage Vla=Vla3 to Vla4 while the lamp voltage Vla is rising after the lighting start.

(3) In a case of the lamp power Pla=the dimming power Pd in the previous stable lighting mode whereas the lamp power Pla=the rated power Pf in this-time lighting start mode, the operating frequency setter 41*a* refers to the data table 41*c*, and thus selects an operating frequency fa5 on the basis of the lamp voltage Vla in the previous stable lighting mode. Hence, as shown in Part (d) of FIG. 5, the operating frequency setter 41*a* sets the operating frequency fa: at the operating frequency fa1 in this-time stable lighting mode, and then at the operating frequency fa5 higher than the operating frequency fa1 during a time period when the lamp voltage Vla=Vla5 to Vla6 while the lamp voltage Vla is rising after the lighting start.

(4) In a case of the lamp power Pla=the rated power Pf in the previous stable lighting mode whereas the lamp power Pla=the dimming power Pd in this-time lighting start mode, the operating frequency setter 41*a* also sets up an operating frequency higher than an operating frequency in the previous stable lighting mode during the predetermined time period after the lamp starts lighting until reaching a stable lighting state.

A prerequisite for the foregoing controls (1) to (4) is that the operating frequencies fa2, fa4, fa5 are set at frequencies higher than the operating frequency f0 in the previous stable lighting mode. However, the size relationship between the operating frequencies fa1 and fa3 and the size relationship among the operating frequencies fa2, fa4 and fa5 need not satisfy the relationships shown in FIG. 5. Depending on the necessity, the size relationship between the operating frequencies fa1 to fa5 may be set at frequencies with which the rise of the lamp voltage Vla can be suppressed.

The higher operating frequencies fa2, fa4, fa5 are temporarily set at the timings when the lamp voltage Vla reaches the lamp voltages Vla1, Vla3, Vla5, respectively. To this end, the lamp voltages Vla1, Vla3, Vla5 are set up in process of the rising of the lamp voltage Vla after the lamp starts to be lighted, in FIG. 5. However, the operating frequencies fa2, fa4, fa5 may be set at timings when the switching elements Q2 to Q5 shift their switching frequencies from the higher ones at the start of operation to the lower ones at the start of lighting, respectively.

Furthermore, the operating frequencies fa2, fa5 are returned to the operating frequency fa1 in this-time stable lighting mode at timings when the lamp voltage Vla reaches the lamp voltages Vla2, Vla6, respectively. To this end, each of the lamp voltages Vla2, Vla6 is set at a lamp voltage with which the discharge lamp lighting device should start to perform a constant power control in the full light mode, in FIG. 5. On the other hand, the operating frequency fa4 is returned to the operating frequency fa3 in this-time stable lighting mode at a timing when the lamp voltage Vla reaches the lamp voltage Vla4. To this end, the lamp voltage Vla4 is set at a lamp voltage with which the discharge lamp lighting device should start to perform a constant power control in the dim light mode. However, the lamp voltages Vla2, Vla4, Vla6 may be higher or lower than, or equal to the lamp voltage with which the constant power control is started.

In short, the voltages Vla1 to Vla6 may be set at voltages which are effective enough to suppress the rise of the lamp voltage Vla depending on the necessity.

(Third Configuration)

Figure 7:
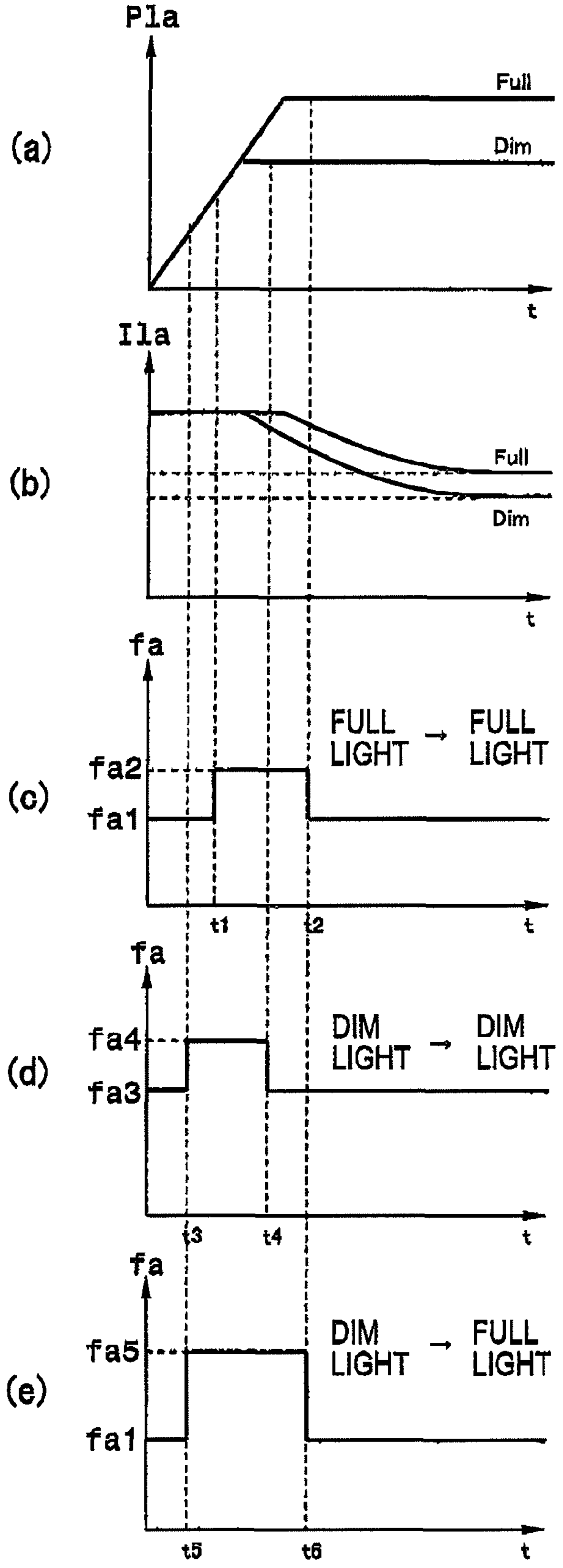
FIG. 7 Parts (a) to (e) of FIG. 7 are diagrams showing how to control an operating frequency according to a third configuration of Embodiment 1.

Similar to the second configuration, referring to the data table 41*c*, the operating frequency setter 41*a* according to the third configuration selects the operating frequency fa for a predetermined time period after the lamp starts lighting until reaching a stable lighting state on the basis of the lamp voltage Vla in the previous stable lighting mode. However, the operating frequency setter 41*a* according to the third configuration is different from the operating frequency setter 41*a* according to the second configuration in that the predetermined time period is set up on the basis of a time elapsed after the lamp starts lighting. FIG. 7 shows how the operating frequency setter 41*a* operates. Part (a) of FIG. 7 shows a relationship between an elapsed time t after the lamp starts lighting and a lamp voltage Vla with respect to the rated light (full light) mode and the dim light (Dim light) mode. Part (b) of FIG. 7 shows a relationship between an elapsed time t after the lamp starts lighting and a lamp current Ila with respect the rated light (full light) mode and the dim light (Dim light) mode. The discharge lamp lighting device shifts a constant current control to a constant power control once the predetermined time has passed.

To this end, referring to the data table 41*c*, the operating frequency setter 41*a* performs one of the following controls (1) to (4) (see FIG. 7).

(1) In a case of the lamp power Pla=the rated power Pf in the previous stable lighting mode whereas the lamp power Pla the rated power Pf in this-time lighting start mode, the operating frequency setter 41*a* refers to the data table 41*c*, and selects an operating frequency fa2 on the basis of a lamp voltage Vla in the previous stable lighting mode. As shown in Part (c) of FIG. 7, the operating frequency setter 41*a* sets the operating frequency fa: at an operating frequency fa1 in this-time stable lighting mode, when the lamp starts to be lighted; and then at the operating frequency fa2 higher than the operating frequency fa1 during a time period between elapsed times t1 to t2 after the lamp starts lighting.

(2) In a case of the lamp power Pla=the dimming power Pd in the previous stable lighting mode whereas the lamp power Pla=the dimming power Pd in this-time lighting start mode, the operating frequency setter 41*a* refers to the data table 41*c*, and selects an operating frequency fa4 on the basis of a lamp voltage Vla in the previous stable lighting mode. As shown in Part (d) of FIG. 7, the operating frequency setter 41*a* sets the operating frequency fa: at an operating frequency fa3 in this-time stable lighting mode, when the lamp starts to be lighted; and then at the operating frequency fa4 higher than the operating frequency fa3 during a time period between elapsed times t3 to t4 after the lamp starts lighting.

(3) In a case of the lamp power Pla=the dimming power Pd in the previous stable lighting mode whereas the lamp power Pla=the rated power Pf in this-time lighting start mode, the operating frequency setter 41*a* refers to the data table 41*c*, and selects an operating frequency fa5 on the basis of a lamp voltage Vla in the previous stable lighting mode. As shown in Part (e) of FIG. 7, the operating frequency setter 41*a* sets the operating frequency fa: at the operating frequency fa1 in this-time stable lighting mode, when the lamp starts to be lighted, and then at the operating frequency fa5 higher than the operating frequency fa1 during a time period between elapsed times t5 to t6 after the lamp starts lighting.

(4) In a case of the lamp power Pla=the rated power Pf in the previous stable lighting mode whereas the lamp power Pla=the dimming power Pd in this-time lighting start mode, too, the operating frequency setter 41*a* sets up a time period during which the operating frequency fa becomes higher, when a certain time period has passed since the lighting start.

A prerequisite for the foregoing controls (1) to (4) is that the operating frequencies fa2, fa4, fa5 are set at frequencies higher than the operating frequency f0 in the previous stable lighting mode. However, the size relationship between the operating frequencies fa1 and fa3 and the size relationship among the operating frequencies fa2, fa4 and fa5 need not satisfy the relationships shown in FIG. 7. Depending on the necessity, the size relationship between the operating frequencies fa1 to fa5 may be set at frequencies with which the rise of the lamp voltage Vla can be suppressed.

In FIG. 7, the operating frequency fa is temporarily set at the higher operating frequencies fa2, fa4, fa5 at the timings which are the times t1, t3, t5, respectively. To this end, the times t1, t3, t5 are set up in process of rising of the lamp voltage Vla after the lamp starts to be lighted. However, the operating frequencies fa2, fa4 fa5 may be set at timings when the switching elements Q2 to Q5 shift their switching frequencies from the higher ones at the start of operation to the lower ones at the start of lighting, respectively.

Furthermore, the operating frequencies fa2, fa5 are returned to the operating frequency fa1 in this-time stable lighting mode at timings of elapsed times t2, t6, respectively, in FIG. 7. To this end, each of the times t2, t6 is set up at a timing, or later, at which the discharge lamp lighting device should start a constant power control in a full light mode. On the other hand, the operating frequency fa4 is returned to the operating frequency fa3 in this-time stable lighting mode at a timing of the elapsed time t4. To this end, the elapsed time t4 is set at a timing, or later, at which the discharge lamp lighting device should start a constant power control in a dim light mode. However, each of the timings is not limited to this timing. In short, the elapsed times t1 to t6 may be set at times effective enough to suppress the rise of the lamp voltage Vla depending on the necessity.

As described above, the present embodiment makes it possible to optimally control the operating frequency fa which is set up for the predetermined time period after the lamp starts lighting until reaching a stable lighting state, in consideration of the conditions in the previous stable lighting mode. In addition, the operating frequency fa for the predetermined time period is made higher than the operating frequency in the previous stable lighting mode, and thereby the rise of the lamp voltage Vla after the lamp starts lighting until reaching a stable lighting state is suppressed. This enables expansion of the lifespan of the lamp. Moreover, a decrease in the lamp current due to the rise of the lamp voltage Vla does not occur in the constant power region, and accordingly the temperatures of the respective electrodes are not lowered. This enables suppression of the occurrence of arc jump. Furthermore, an excessive rise of the temperatures of the respective electrodes can be suppressed in the current limit region, because a length of a half time period of the lamp current Ila is made shorter. Consequently, the output from the power converting circuit can be optimally controlled in consideration of the history of the conditions in the previous stable lighting mode, and therefore the rise of the lamp voltage Vla after the lamp starts lighting until reaching a stable lighting state can be suppressed. This enables expansion of the lifespan of the lamp and suppression of the occurrence of arc jump.

Embodiment 2

Figure 8:
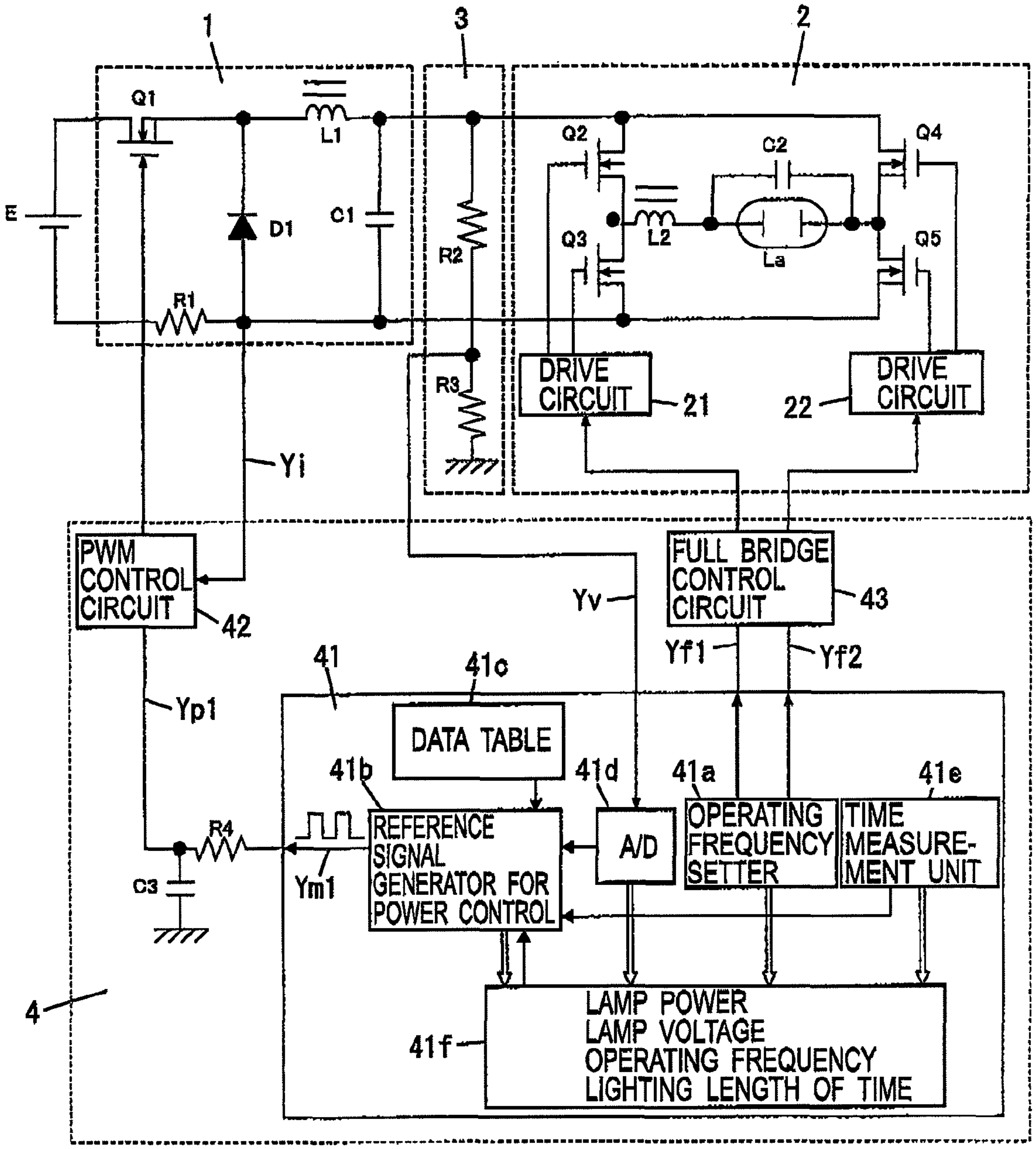
FIG. 8 is a diagram showing a configuration of a discharge lamp lighting device according to Embodiment 2.

FIG. 8 shows a circuit configuration of a discharge lamp lighting device according to the present embodiment. The micon 41 includes an operating frequency setter 41*a*, a reference signal generator 41*b* for power control, a data table 41*c*, an A/D converter 41*d*, a time measurement unit 41*e*, and a memory 41*f*. The A/D converter 41*d* is configured to convert a lamp voltage detection signal Yv from the lamp voltage detection circuit 3 to a digital signal, and thus to output the digital signal to the reference signal generator 41*b* for power control, and the memory 41*f*.

The operating frequency setter 41*a* determines switching frequencies (operating frequencies) of the respective switching elements Q2 to Q5 in a polarity inversion circuit 2. Thus, the operating frequency setter 41*a* outputs the inverter control signals Yf1, Yf2 corresponding to the determined switching frequencies, to a full-bridge control circuit 43. The full-bridge control circuit 43 controls the drive circuits 21, 22 in order that the switching elements Q2 to Q5 in the polarity inversion circuit 2 should be driven on and off with their respective switching frequencies instructed by the inverter control signals Yf1, Yf2.

The reference signal generator 41*b* for power control outputs a PWM signal Ym1 on the basis of the lamp voltage detection signal Yv, sets of data stored in the data table 41*c* and the memory 41*f*, and the time measured by the time measurement unit 41*e*. The PWM signal Ym1 has a duty which is set up in order that the root-mean-square value Ila of the lamp current (hereinafter referred to as a "lamp current Ila) should be equal to a desired value. The PWM signal Ym1 is smoothed by a filter circuit including a resistor R4 and a capacitor C3. Thus, as a chopper controlling reference signal Yp1, a direct-current voltage thus obtained is inputted into a PWM control circuit 42. Subsequently, on the basis of the chopper controlling reference signal Yp1 and a current detection signal Yi, the PWM control circuit 42 drives on and off the switching element Q1 in the step-down chopper circuit 1.

Embodiment 2 is different from Embodiment 1 in that, as described above, the reference signal generator 41*b* for power control is configured to suppress the rise of the lamp voltage Vla in such a manner that the lamp current Ila is controlled by referring to the sets of data stored in the data table 41*c* and the memory 41*f*. Components which are the same as those in Embodiment 1 will be denoted by the same reference numerals, and descriptions for those components will be omitted.

The control circuit 4 controls the output to the lamp after the lamp starts lighting until reaching a stable lighting state as follows. Until the lamp voltage Vla reaches a predetermined voltage, the control circuit 4 performs a constant current control in order that the lamp current Ila should not exceed a current limit I0. Once the lamp voltage Vla reaches the predetermined voltage, the control circuit 4 shifts to a constant power control process in which the lamp power Pla is controlled in order to remain constant. In the present embodiment, for a predetermined time period after the lamp starts lighting until reaching a stable lighting state, the reference signal generator 41*b* for power control makes the lamp current Ila lower than the current limit I0 of the constant current control region on the basis of the lighting conditions in the previous stable lighting mode, and which are stored in the memory 41*f*. To this end, a time period when the lamp current Ila is made smaller than the current limit I0 is set up until the lamp becomes lighted stably, so that the rise of the lamp voltage Vla is suppressed. Descriptions will be hereinbelow provided for first to third configurations each enabling this operation. Note that the above-described predetermined period includes at least part of the constant current control region.

(First Configuration)

Figures 9, 10:
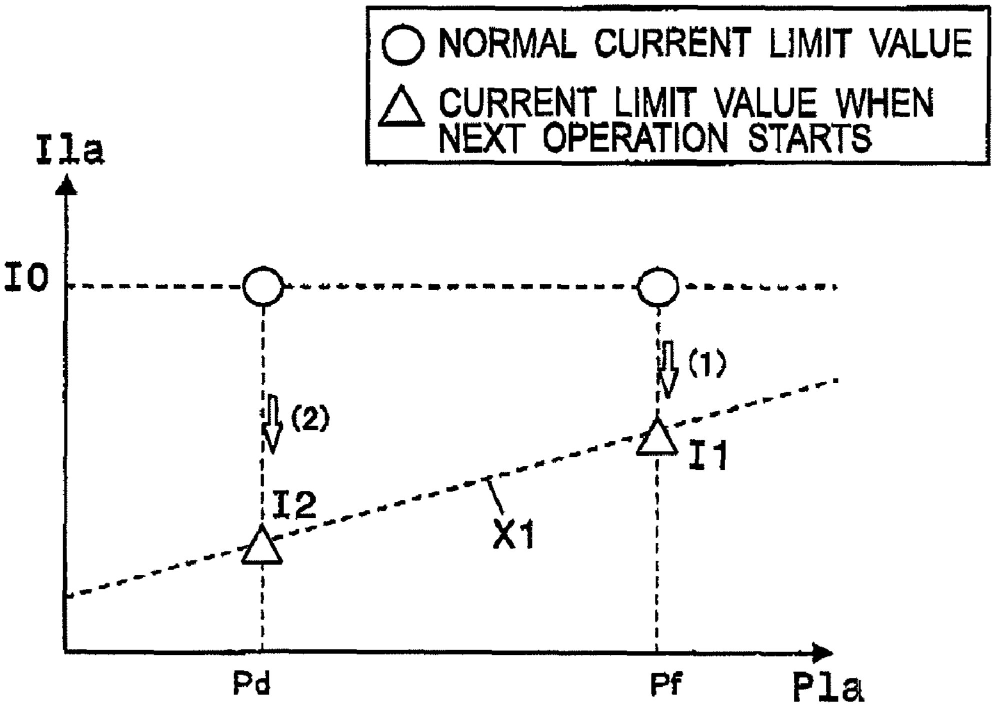
FIG. 9 is a diagram showing a configuration of a data table according to a first configuration of Embodiment 2.
FIG. 10 is a diagram showing transitions of an operating frequency according to the first configuration of Embodiment 2.

In the first configuration, as shown in FIG. 9, the data table 41*c* beforehand stores values I1, I2 representing the lamp current Ila with one of which the lamp should be lighted after the lamp starts lighting until reaching a stable lighting state. Referring to this data table 41*c*, the reference signal generator 41*b* for power control sets up a value of the lamp current Ila for the predetermined time period. Thus, the reference signal generator 41*b* for power control makes one of the following controls (1) to (2) (see FIG. 10).

(1) In a case of the lamp power Pla=the rated power Pf in the previous stable lighting mode, the reference signal generator 41*b* for power control sets up the lamp current Ila=the lamp current I1, which is smaller than the current limit I0 (where I1<I0) for the predetermined time period after the lamp starts lighting until reaching a stable lighting state.

(2) In a case of the lamp power Pla=the dimming power Pd in the previous stable lighting mode, the reference signal generator 41*b* for power control sets up the lamp current Ila=the lamp current I2, which is smaller than the current limit I0 (where I2<I1<I0) for the predetermined time period after the lamp starts lighting until reaching a stable lighting state.

In FIGS. 9 and 10, the lamp current Ila in this-time lighting start mode is determined depending on the lamp power Pla in the previous stable lighting mode. However, the lamp current Ila in this-time lighting start mode may be determined depending on the lamp power Pla in the previous stable lighting mode and the lamp power Pla in this-time lighting start mode. In the present embodiment, the power is switched between the two steps consisting of the rated power Pf and the dimming power Pd. However, in cases of dimming in multi-step of three steps or more, and continuous dimming, the lamp current for the predetermined time period may be set up along a broken line in FIG. 10 which represents a characteristic X1 in such a way so as to correspond to the lamp power Pla in the previous stable lighting mode.

(Second Configuration)

Figure 11:
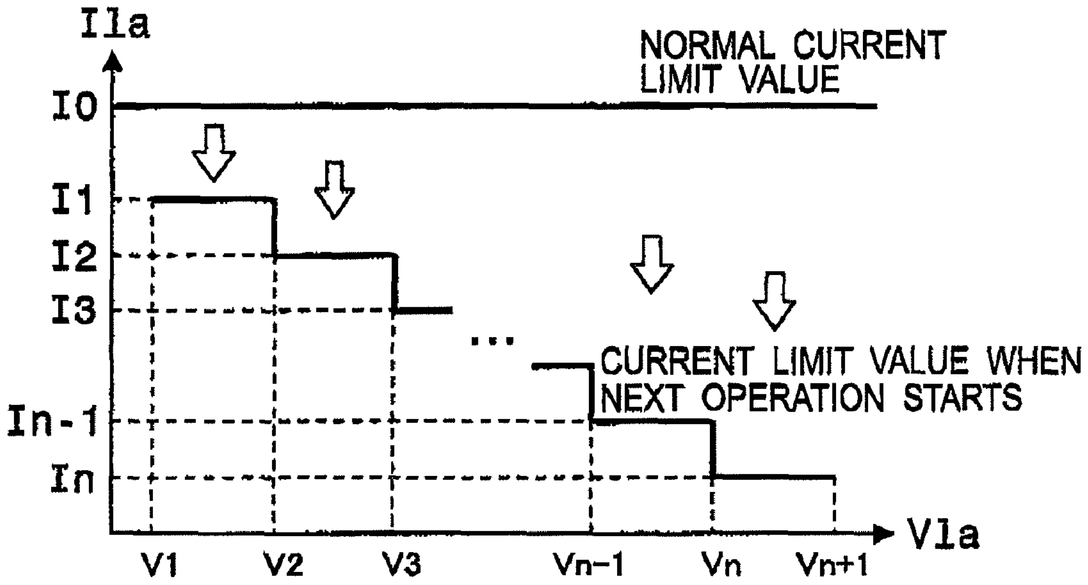
FIG. 11 is a diagram showing how to set up an operating frequency according to a second configuration of Embodiment 2.
Figure 12:
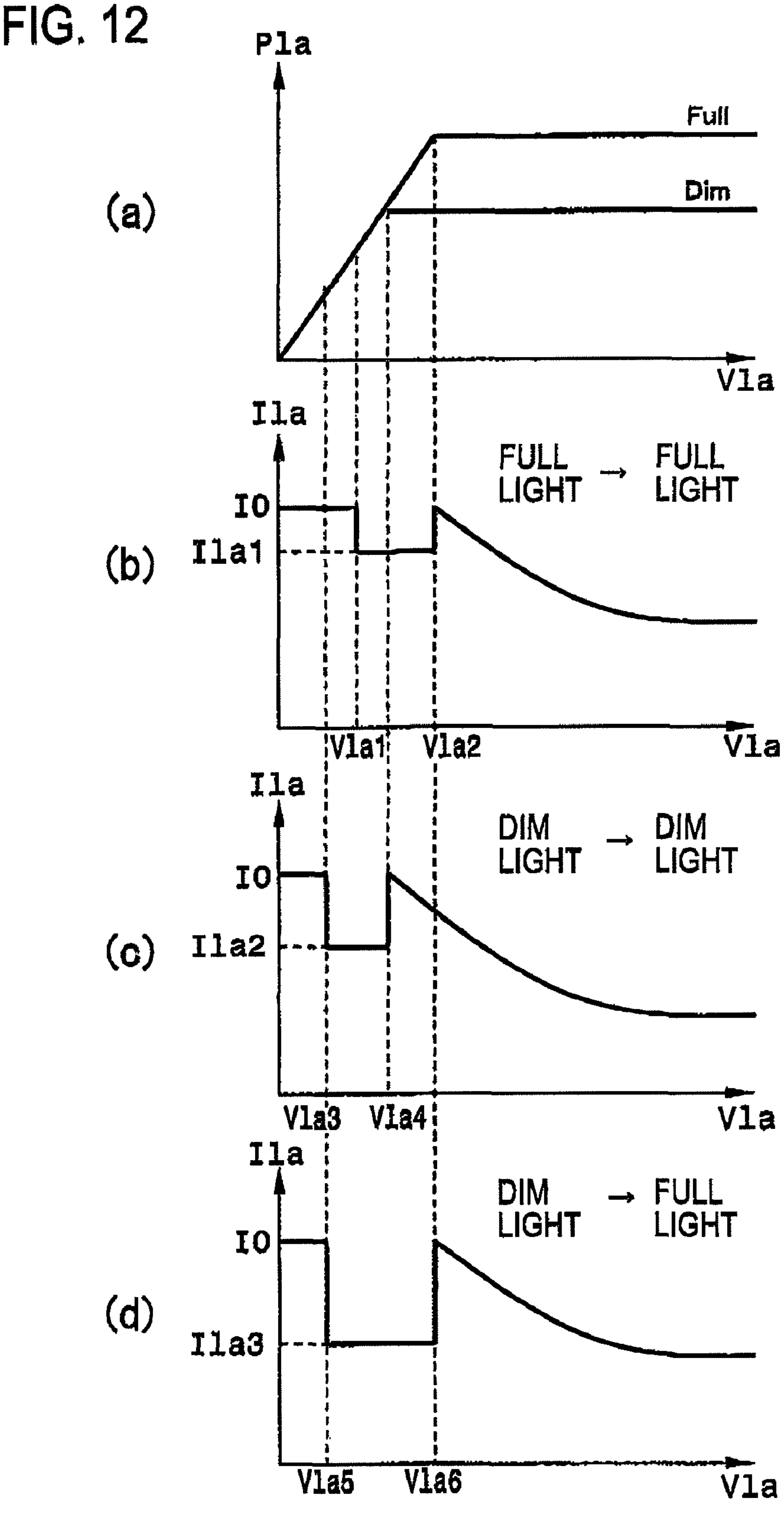
FIG. 12 Parts (a) to (d) of FIG. 12 are diagrams showing how to control an operating frequency according to the second configuration of Embodiment 2.

In the second configuration, a value representing the lamp current Ila for a predetermined time period after the lamp starts lighting until reaching a stable lighting state is set up within the period after the lamp starts lighting until reaching a stable lighting state on the basis of a lamp voltage Vla in the previous stable lighting mode; and the predetermined time period is set up on the basis of the lamp voltage Vla. FIGS. 11 and 12 show how this operation works.

Figures 13, 14:
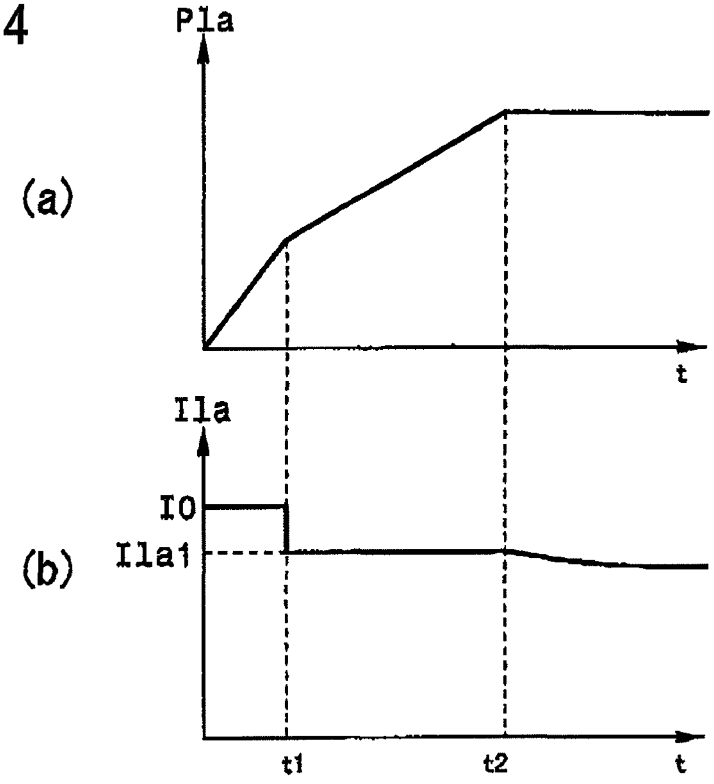
FIG. 13 is a diagram showing a configuration of a data table according to the second configuration of Embodiment 2.
FIG. 14 Parts (a) and (b) of FIG. 14 are diagrams showing how to control an operating frequency according to a third configuration of Embodiment 3.

As shown in FIG. 13, the data table 41*c* beforehand stores lamp currents I1 to In respectively corresponding to n steps (V1 to V2, V2 to V3, . . . , Vn to Vn+1) of lamp voltages Vla in the previous stable lighting mode (before the lamp is turned off), the n steps obtained by dividing the lamp voltages Vla on the basis of the degree thereof. The lamp currents I1 to In are further divided into; lamp currents If1 to Ifn in a case of the lighting power Pla=the rated power Pf in this-time lighting start mode; and lamp currents Id1 to Idn in a case of the lighting power Pla=the dimming power Pd in this-time lighting start mode.

Referring to the data table 41*c*, the reference signal generator 41*b* for power control selects the lamp current Ia for the predetermined time period out of the lamp currents I1 to In corresponding to the lamp voltage Vla in the previous stable lighting mode. As shown in FIG. 11, these lamp currents I1 to In are set up so as to be lower than the current limit I0 of the constant current control region. In addition, spans of the respective n divisional steps of the lamp voltage Vla may be set up each time the A/D converter 41*d* outputs one bit of its digital signal, or several bits to several hundred bits of its digital signal.

Referring to this data table 41*c*, the reference signal generator 41*b* for power control performs one of the following controls (1) to (4) (see FIG. 12). Note that Part (a) of FIG. 12 shows a relationship between the lamp voltage Vla and the lamp power Pla with respect to the rated light mode (full light mode) and the dim light (Dim light) mode, and shows that the lamp voltage Vla rises after the lighting start so that the discharge lamp lighting device shifts from a constant current control to a constant power control at a predetermined voltage.

(1) In a case of the lamp power Pla=the rated power Pf in the previous stable lighting mode whereas the lamp power Pla=the rated power Pf in this-time lighting start mode, the reference signal generator 41*b* for power control refers to the data table 41*c*, and thus selects a lamp current Ila1 on the basis of the lamp voltage Vla in the previous stable lighting mode. Hence, as shown in Part (b) of FIG. 12, the reference signal generator 41*b* for power control reduces the lamp current Ila to the lamp current Ila1 which is lower than the current limit I0 for a time period when the lamp voltage Vla=Vla1 to Vla2, while the lamp current Ila is being controlled in order not to exceed the current limit I0 after the lamp starts to be lighted.

(2) In a case of the lamp power Pla=the dimming power Pd in the previous stable lighting mode whereas the lamp power Pla=the dimming power Pd in this-time lighting start mode, the reference signal generator 41*b* for power control refers to the data table 41*c*, and thus selects a lamp current Ila2 on the basis of the lamp voltage Vla in the previous stable lighting mode. Hence, as shown in Part (c) of FIG. 12, the reference signal generator 41*b* for power control reduces the lamp current Ila to the lamp current Ila2 which is lower than the current limit I0 for a time period when the lamp voltage Vla=Vla3 to Vla4, while the lamp current Ila is being controlled in order not to exceed the current limit I0 after the lamp starts to be lighted.

(3) In a case of the lamp power Pla=the dimming power Pd in the previous stable lighting mode whereas the lamp power Pla=the rated power Pf in this-time lighting start mode, the reference signal generator 41*b* for power control refers to the data table 41*c*, and thus selects a lamp current Ila3 on the basis of the lamp voltage Vla in the previous stable lighting mode. Hence, as shown in Part (d) of FIG. 12, the reference signal generator 41*b* for power control reduces the lamp current Ila to the lamp current Ila3 which is lower than the current limit I0 for a time period when the lamp voltage Vla=Vla5 to Vla6, while the lamp current Ila is being controlled in order not to exceed the current limit I0 after the lamp starts to be lighted.

(4) In a case of the lamp power Pla=the rated power Pf in the previous stable lighting mode whereas the lamp power Pla=the dimming power Pd in this-time lighting start mode, the reference signal generator 41*b* for power control also sets the lamp current Ila at a value which is lower than the current limit I0 for the predetermined time period after the lamp starts lighting until reaching a stable lighting state.

A prerequisite for the foregoing controls (1) to (4) is that the lamp currents Ila1, Ila2, Ila3 are set at values which are lower than the current limit I0. However, the size relationship among the lamp currents Ila1, Ila2, Ila3 need not satisfy the relationship of Ila1>Ila2>Ila3 shown in FIG. 12. Depending on the necessity, the size relationship among the lamp currents Ila1, Ila2, Ila3 may be set at lamp currents with which the rise of the lamp voltage Vla can be suppressed.

The lower lamp currents Ila1, Ila2, Ila3 are temporarily set at the timings when the lamp voltage Vla reaches the lamp voltages Vla1, Vla3, Vla5, respectively. To this end, the lamp voltages Vla1, Vla3, Vla5 are set up in process of the rising of the lamp voltage Vla after the lamp starts to be lighted, in FIG. 12. However, the lower lamp currents Ila1, Ila2, Ila3 may be set at timings when the switching elements Q2 to Q5 shift their switching frequencies from the higher ones at the start of operation to the lower ones at the start of lighting, respectively.

Furthermore, the lamp currents Ila1, Ila3 are returned to the current limit I0 at timings when the lamp voltage Vla reaches the lamp voltages Vla2, Vla6, respectively. To this end, the lamp voltages Vla2, Vla6 are each set at a lamp voltage with which a constant power control in the full light mode should be started, in FIG. 12. On the other hand, the lamp current Ila2 is returned to the current limit I0 at a timing when the lamp voltage Vla reaches the lamp voltage Vla4. To this end, the lamp voltage Vla4 is set at a lamp voltage with which a constant power control in the dim light mode should be started. However, the lamp voltages Vla2, Vla4, Vla6 may be higher or lower than, or equal to the lamp voltage with which the constant power control is started. In short, the voltages Vla1 to Vla6 may be set at voltages which are effective enough to suppress the rise of the lamp voltage Vla depending on the necessity.

(Third Configuration)

Similar to the second configuration, referring to the data table 41*c*, the reference signal generator 41*b* for power control according to the third configuration selects the lamp current Ila for a predetermined time period after the lamp starts lighting until reaching a stable lighting state on the basis of the lamp voltage Vla in the previous stable lighting mode. However, the reference signal generator 41*b* for power control according to the third configuration is different from the one according to the second configuration in that the predetermined time period is set up on the basis of a time elapsed after the lamp starts lighting. FIG. 14 shows how the reference signal generator 41*b* for power control operates.

Part (a) of FIG. 14 shows a relationship between an elapsed time t after the lamp starts lighting and a lamp voltage Vla. Part (b) of FIG. 14 shows a relationship between an elapsed time t after the lamp starts lighting and a lamp current Ila. The reference signal generator 41*b* for power control reduces the lamp current Ila to the lamp current Ila1 which is lower than the current limit I0 for a time period between elapsed times t1 and t2 after the lamp starts lighting, while the lamp current Ila is being controlled in order not to exceed the current limit I0 after the lamp starts to be lighted.

This lamp current Ila1 is set up depending on patterns including: (1) a case of the lamp power Pla=the rated power Pf in the previous stable lighting mode whereas the lamp power Pla=the rated power Pf in this-time lighting start mode; (2) a case of the lamp power Pla=the dimming power Pd in the previous stable lighting mode whereas the lamp power Pla=the dimming power Pd in this-time lighting start mode; (3) a case of the lamp power Pla=the dimming power Pd in the previous stable lighting mode whereas the lamp power Pla=the rated power Pf in this-time lighting start mode; and (4) a case of the lamp power Pla=the rated power Pf in the previous stable lighting mode whereas the lamp power Pla=the dimming power Pd in this-time lighting start mode. The elapsed times t1, t2 are also set up depending on the foregoing patterns (1) to (4).

Alternatively, the lamp current Ila may be set up as a lamp current (Pla/Vla) calculated from the lamp power Pla and the lamp voltage Vla in the previous stable lighting mode. In this case, the elapsed time t2 of a timing at which the lamp current Ila is returned from the lamp current Ila to the current limit I0 is set as a time at which the lamp power Pla reaches a predetermined lamp power which the lamp voltage Vla is in its progressively rising process after the lighting start. For example, if the lamp current Ila1 in the case of the lamp power Pla=the rated power Pf in this-time lighting start mode is equal to that in the case of the lamp power Pla=the dimming power Pd in this-time lighting start mode, the elapsed times t2 in the cases of the lamp power Pla=the rated power Pf in this-time lighting start mode and the lamp power Pla=the dimming power Pd in this-time lighting start mode are set as times which are different from each other. In addition, if different lamp currents Ila1 are set for the cases of the lamp power Pla=the rated power Pf in this-time lighting start mode and the lamp power Pla=the dimming power Pd in this-time lighting start mode, the same elapsed time t2 is set for the cases of the lamp power Pla=the rated power Pf in this-time lighting start mode and the lamp power Pla=the dimming power Pd in this-time lighting start mode.

The lamp current Ila is temporarily set at the lamp current Ila1 at the timing which is the elapsed time t1. To this end, the elapsed time t1 is set up as a time when the lamp voltage Vla is in its rising process after the lighting start, in FIG. 14. However, the lamp current Ila1 may be set at timings when the switching elements Q2 to Q5 shift their switching frequencies from the higher ones at the start of operation to the lower ones at the start of lighting, respectively.

In short, the elapsed times t1, t2 may be set up at times effective enough to suppress the rise of the lamp voltage Vla depending on the necessity.

As described above, the present embodiment makes it possible to optimally control the lamp current Ila which is set up for the predetermined time period after the lamp starts lighting until reaching a stable lighting state, in consideration of the conditions in the previous stable lighting mode. In addition, the lamp current Ila for the predetermined time period is made smaller than the current limit I0 of the constant current control region, and thereby the rise of the lamp voltage Vla after the lamp starts lighting until reaching a stable lighting state is suppressed. This enables expansion of the lifespan of the lamp. Moreover, a decrease in the lamp current due to the rise of the lamp voltage Vla does not occur in the constant power region, and accordingly the temperatures of the respective electrodes are not lowered. This enables suppression of the occurrence of arc jump. Furthermore, an excessive rise of the temperatures of the respective electrodes can be suppressed in the current limit region. Consequently, the output from the power converting circuit can be optimally controlled in consideration of the history of the conditions in the previous stable lighting mode, and therefore the rise of the lamp voltage Vla after the lamp starts lighting until reaching a stable lighting state can be suppressed. This enables expansion of the lifespan of the lamp and suppression of the occurrence of arc jump.

Embodiment 3

Figure 15:
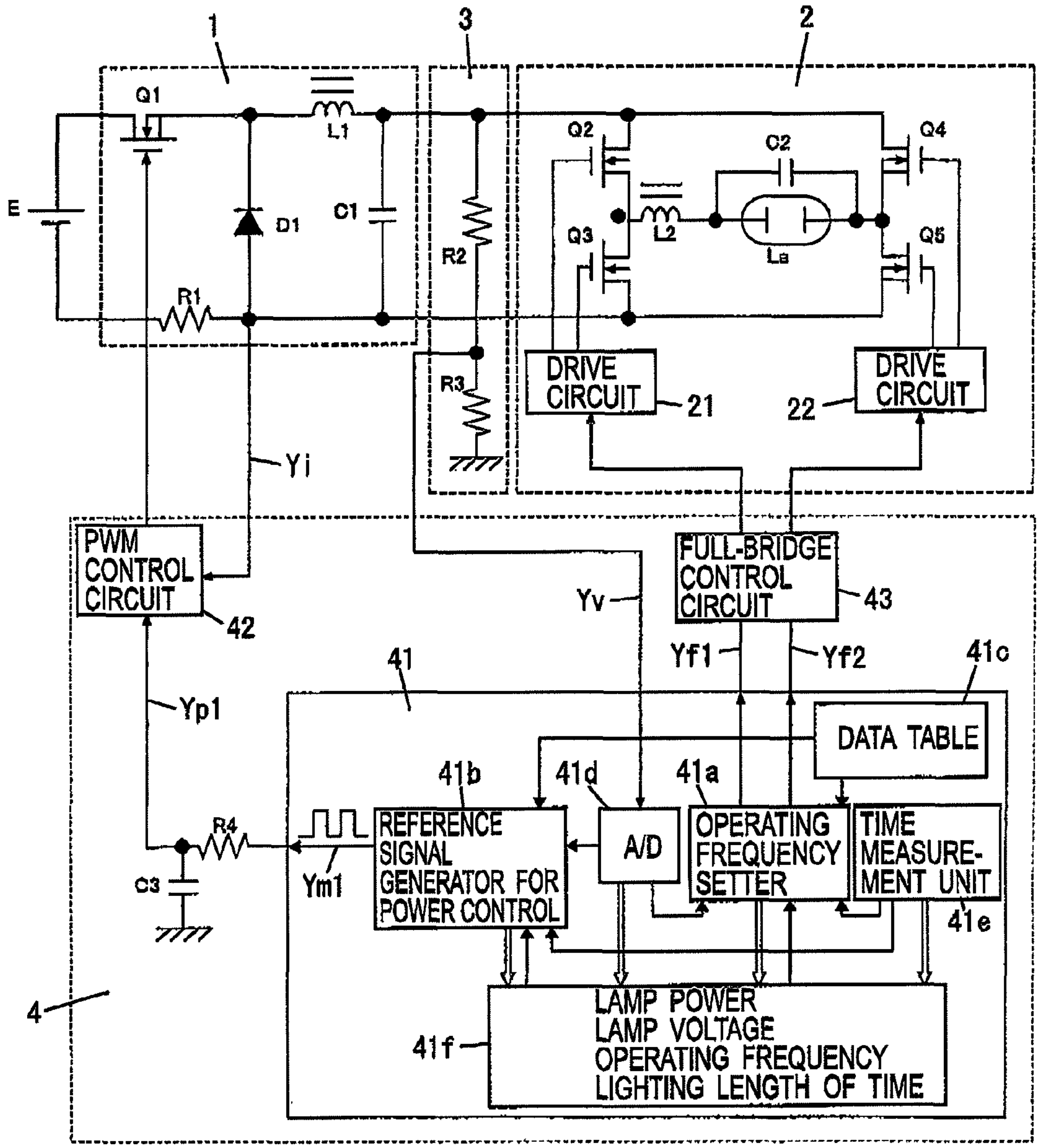
FIG. 15 is a diagram showing a configuration of a discharge lamp lighting device according to Embodiment 3.

FIG. 15 shows a circuit configuration of a discharge lamp lighting device according to the present embodiment. The micon 41 includes an operating frequency setter 41*a*, a reference signal generator 41*b* for power control, a data table 41*c*, an A/D converter 41*d*, a time measurement unit 41*e*, and a memory 41*f*. The A/D converter 41*d* is configured to convert a lamp voltage detection signal Yv from the lamp voltage detection circuit 3 to a digital signal, and thus to output the digital signal to the operating frequency setter 41*a*, the reference signal generator 41*b* for power control, and the memory 41*f*.

The operating frequency setter 41*a* determines switching frequencies (operating frequencies) of the respective switching elements Q2 to Q5 in the polarity inversion circuit 2 on the basis of the lamp voltage detection signal Yv, sets of data which are stored in the data table 41*c* and the memory 41*f*, and the time measured by the time measurement unit 41*e*. Thus, the operating frequency setter 41*a* outputs the inverter control signals Yf1, Yf2 corresponding to the determined switching frequencies, to a full-bridge control circuit 43. The full-bridge control circuit 43 controls the drive circuits 21, 22 in order that the switching elements Q2 to Q5 in the polarity inversion circuit 2 should be driven on and off with their respective switching frequencies instructed by the inverter control signals Yf1, Yf2.

The reference signal generator 41*b* for power control outputs a PWM signal Ym1 on the basis of the lamp voltage detection signal Yv, sets of data stored in the data table 41*c* and the memory 41*f*, and the time measured by the time measurement unit 41*e*. The PWM signal Ym1 has a duty which is set up in order that the root-mean-square value Ila of the lamp current (hereinafter referred to as a "lamp current Ila) should be equal to a desired value. The PWM signal Ym1 is smoothed by a filter circuit including a resistor R4 and a capacitor C3. Thus, as a chopper controlling reference signal Yp1, a direct-current voltage thus obtained is inputted into a PWM control circuit 42. Subsequently, on the basis of the chopper controlling reference signal Yp1 and a current detection signal Yi, the PWM control circuit 42 drives on and off the switching element Q1 in the step-down chopper circuit 1.

Embodiment 3 is different from embodiments 1 and 2 in that, as described above, the operating frequency setter 41*a* and the reference signal generator 41*b* for power control are respectively configured to control the operating frequency fa and the lamp current Ila, referring to the sets of data stored in the data table 41*c* and the memory 41*f*. Components which are the same as those in embodiments 1 and 2 will be denoted by the same reference numerals, and descriptions for those components will be omitted.

The control circuit 4 controls the output to the lamp after the lamp starts lighting until reaching a stable lighting state as follows. Until the lamp voltage Vla reaches a predetermined voltage, the control circuit 4 performs a constant current control in order that the lamp current Ila should not exceed a current limit I0. Once the lamp voltage Vla reaches the predetermined voltage, the control circuit 4 shifts to a constant power control process in which the lamp power Pla is controlled in order to remain constant. In the present embodiment, for a predetermined time period after the lamp starts lighting until reaching a stable lighting state: the operating frequency setter 41*a* makes the operating frequency fa higher than an operating frequency in the previous stable lighting mode on the basis of lighting conditions in the previous stable lighting mode, and which are stored in the memory 41*f*; and additionally, the reference signal generator 41*b* for power control makes the lamp current Ila lower than the current limit TO of the constant current control region on the basis of the lighting conditions in the previous stable lighting mode, and which are stored in the memory 41*f*. To this end, a time period when the operating frequency fa is raised whereas the lamp current Ila is made smaller than the current limit I0 is setup until the lamp becomes lighted stably. For this reason, Embodiment 3 is capable of flowing more lamp current Ila, preventing the rise of the lamp voltage Vla more securely than Embodiment 2 while securing the rise of luminous flux. Descriptions will be hereinbelow provided for first to third configurations enabling this operation. Note that the above-described predetermined time period includes at least part of the constant current control region.

(First Configuration)

Figures 16, 17:
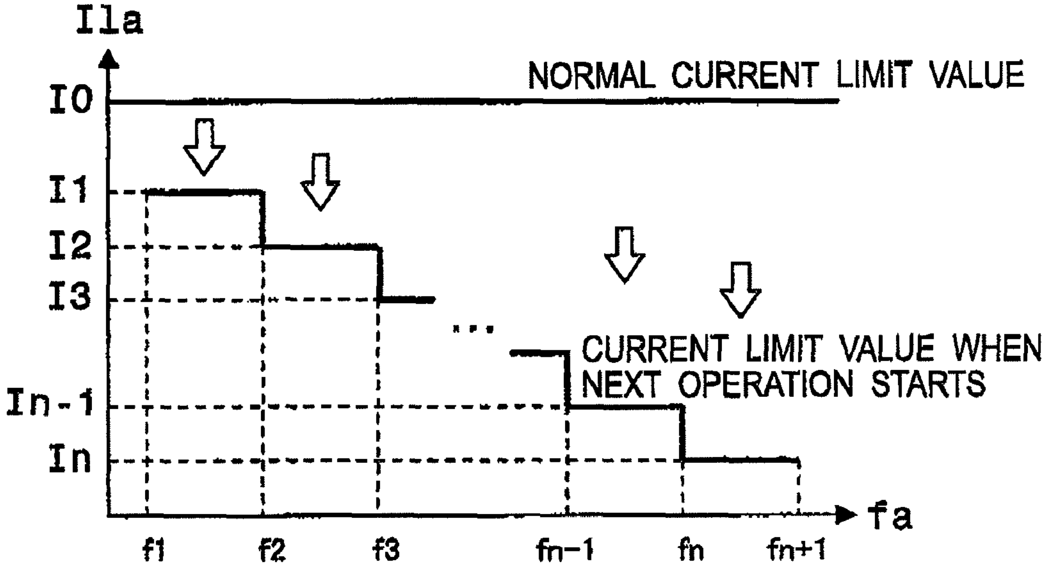
FIG. 16 is a diagram showing how to set up an operating frequency according to a first configuration of Embodiment 3.
FIG. 17 is a diagram showing a configuration of a data table according to the first configuration of Embodiment 3.

In the first configuration, values representing the lamp current Ila for a predetermined time period after the lamp starts lighting until reaching a stable lighting state are set up on the basis of an operating frequency fa in the previous stable lighting mode. The operation is shown in FIG. 16. As shown in FIG. 17, the data table 41*c* beforehand stores lamp currents I1 to In respectively corresponding to n steps (f1 to f2, f2 to f3, . . . , fn to fn+1) of operating frequency fa in the previous stable lighting mode (before the lamp is turned off), the n steps obtained by dividing the operating frequency fa on the basis of the degree thereof. The lamp currents I1 to In are further divided into: lamp currents If1 to Ifn in a case of the lighting power Pla=the rated power Pf in this-time lighting start mode; and lamp currents Id1 to Idn in a case of the lighting power Pla=the dimming power Pd in this-time lighting start mode.

Referring to the data table 41*c*, the reference signal generator 41*b* for power control selects the lamp current Ila for the predetermined time period out of the lamp currents I1 to In corresponding to the lamp voltage Vla in the previous stable lighting mode. As shown in FIG. 16, these lamp currents I1 to In are set up so as to be lower than the current limit I0 of the constant current control region.

Similar to configurations of respective embodiments 2 and 3, referring to this data table 41*c*, the reference signal generator 41*b* for power control according to the present embodiment subsequently sets the lamp current Ila for the predetermined time period at one of the lamp current I1 to In which are smaller than the current limit I0. Note that the lamp currents I1 to In are changed stepwise in FIG. 16, however, the lamp currents I1 to In may be changed as a continuum, as long as the lamp current Ila can be set up as that which makes it possible to suppress the rise of the lamp voltage Vla.

In addition, the method of making the operating frequency fa for the predetermined time period higher than the frequency in the previous stable lighting mode can be implemented by use of one of the first to third configurations which have been described with regard to Embodiment 1.

(Second Configuration)

Figure 18:
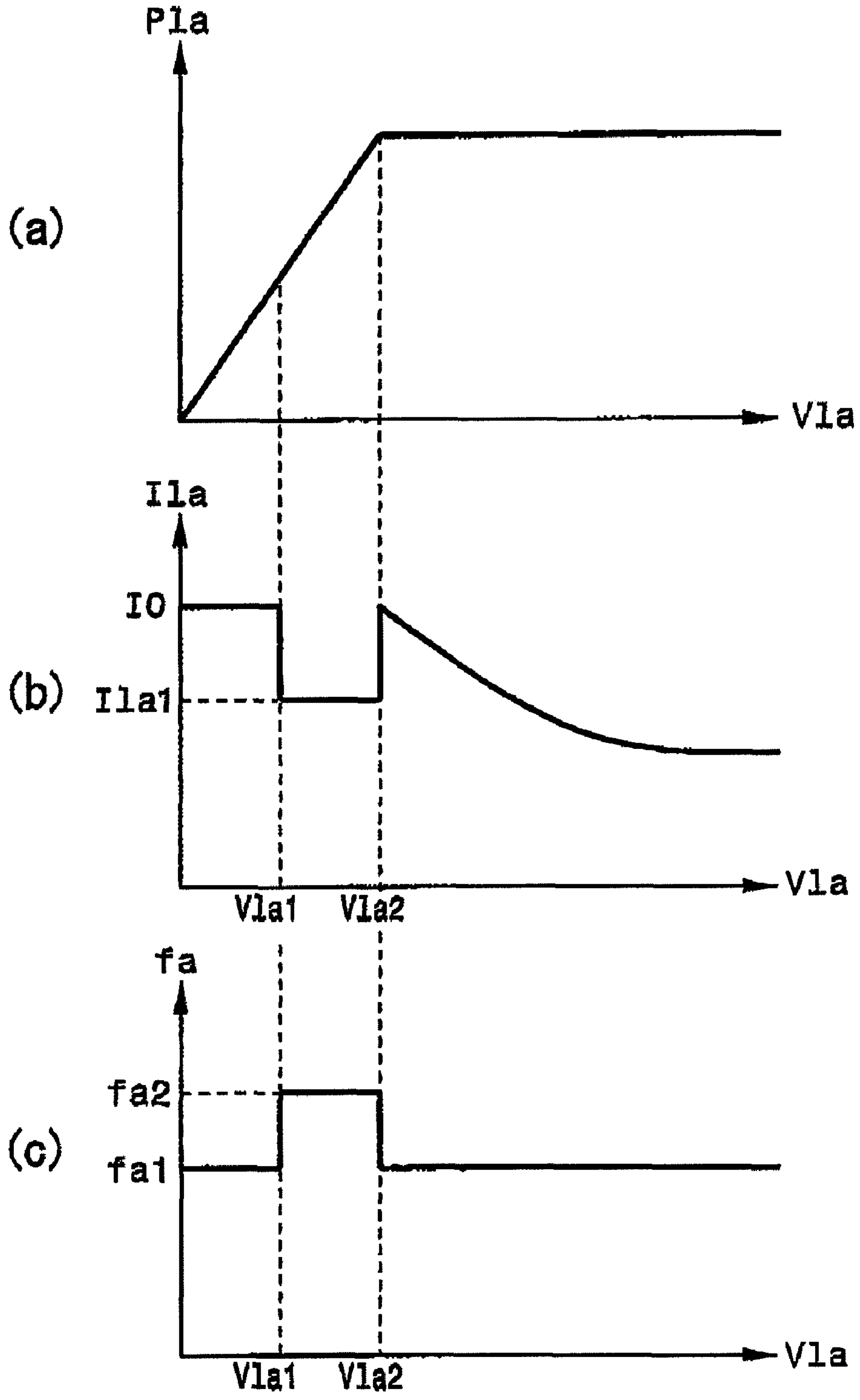
FIG. 18 Parts (a) to (c) of FIG. 18 are diagrams showing how to control an operating frequency according to a second configuration of Embodiment 3.

In the second configuration of the present embodiment, the operating frequency fa for the predetermined time period after the lamp starts lighting until reaching a stable lighting state is set up by using the second configuration which has been described with regard to Embodiment 1, while the lamp current Ila for the predetermined time period is set up by using the second configuration which has been described with regard to Embodiment 2. FIG. 18 shows an example of how the predetermined time period is set up by use of a lamp voltage Vla. Part (a) of FIG. 18 shows a relationship between the lamp voltage Vla and a lamp power Pla. The discharge lamp lighting device shifts from the constant current control region to the constant power control region once the lamp voltage Vla reaches a lamp voltage Vla2.

As shown in Part (b) of FIG. 18, the lamp current Ila is reduced to a lamp current Ila1 which is lower than the current limit I0 for a time period when lamp voltage Vla=Vla1 to Vla2 while the lamp current Ila is controlled in order not to exceed the current limit I0 after the lighting start. As shown in Part (c) of FIG. 18, the operating frequency fa is set, at an operating frequency fa1 in this-time stable lighting mode; and then at an operating frequency fa2 higher than the operating frequency fa1 for the time period when the lamp voltage Vla=Vla1 to Vla2 while the lamp voltage Vla is rising after the lighting start.

In FIG. 18, a timing when the lamp current Ila1 and the operating frequency fa are set up is set up while the lamp voltage Vla is rising after the lighting start. However, the timing may be set up as a timing when the switching elements Q2 to Q5 shift their frequencies from the higher ones at the start of operation to the lower ones at the start of lighting, respectively.

Furthermore, although being set up as the lamp voltage with which the constant power control is started, in FIG. 18, the lamp voltage Vla2 may be higher or lower than, or equal to the lamp voltage with which the constant power control is started.

Moreover, the lamp voltages which make the lamp current Ila change are respectively set equal to the lamp voltages which make the operating frequency fa change, and vice versa in FIG. 18. However, the lamp voltages which make the lamp current Ila change may be set respectively different from the lamp voltages which make the operating frequency fa change, and vice versa. For example, a lamp voltage which makes the lamp current Ila set at a lamp current Ila1 and a lamp voltage which makes the operating frequency fa set at the operating frequency fa2 may be set equal to each other; a lamp voltage which makes the lamp current Ila returned to the current limit I0 may be set equal to a lamp voltage with which the constant power control should be started; and a lamp voltage which makes the operating frequency fa returned to the operating frequency fa1 in this-time stable lighting mode may be set equal to a lamp voltage which the lamp voltage reaches after the discharge lamp lighting device starts its constant power control. If the lamp voltages are set up as described above, it is possible to suppress the rise of the lamp voltage Vla by setting the operating frequency fa at the higher operating frequency fa2 while keeping the lamp power Pla at the rated power, in the constant power control region. In other words, the voltages Vla1, Vla2 may be set up as those effective enough to suppress the rise of the lamp voltage Vla depending on the necessity.

(Third Configuration)

Figure 19:
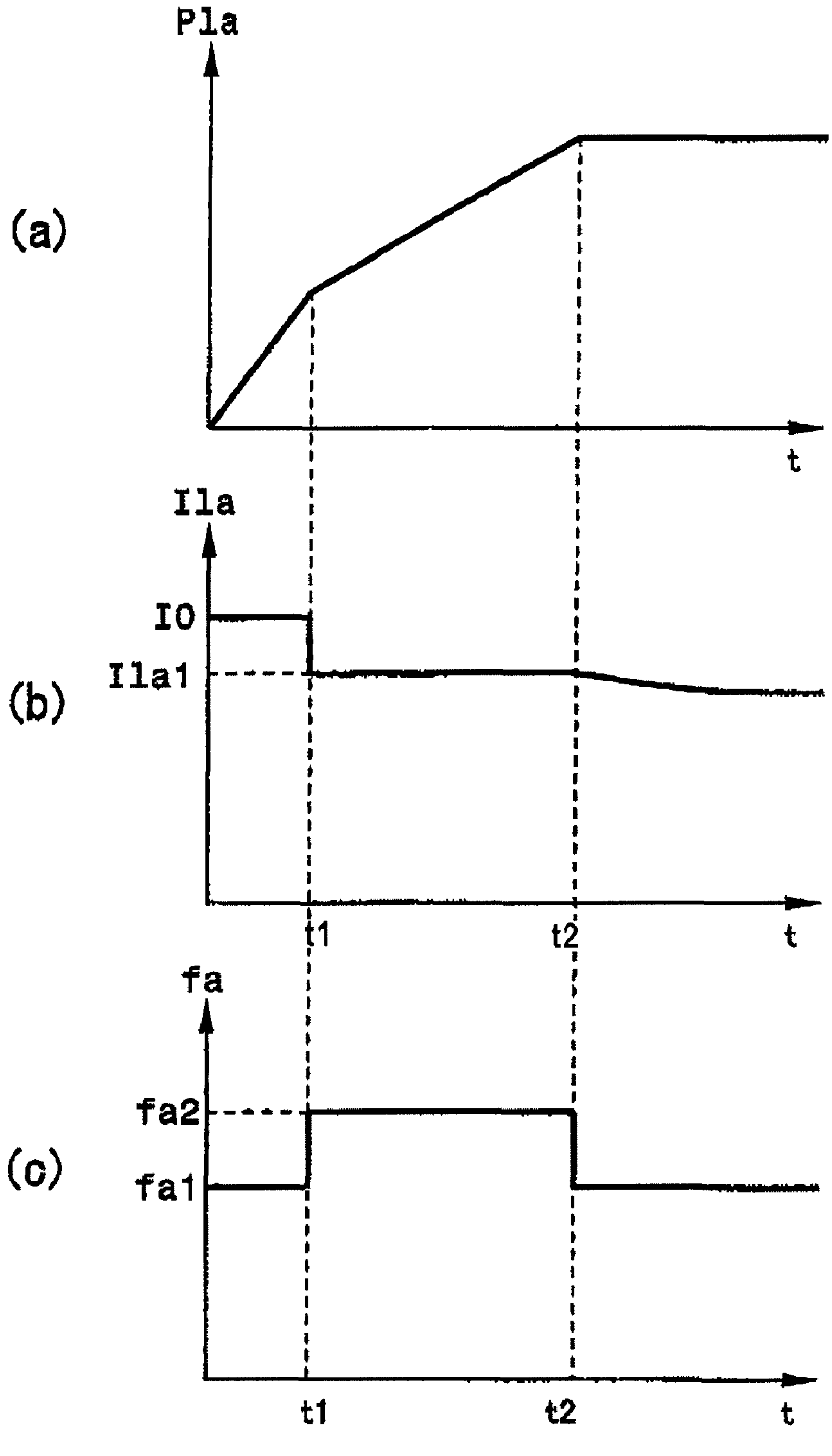
FIG. 19 Parts (a) to (c) of FIG. 19 are diagrams showing how to control a light frequency according to a third configuration of Embodiment 3.

In the third configuration, the operating frequency fa for the predetermined time period is set up by using the third configuration which has been described with regard to Embodiment 1, while the lamp current Ila for the predetermined time period is set up by using the third configuration which has been described with regard to Embodiment 2. FIG. 19 shows an example of how the control timings are set up as elapsed times after the lamp starts lighting. Part (a) of FIG. 19 shows a relationship between an elapsed time t after the lamp starts lighting and a lamp power Pla. The discharge lamp lighting device shifts from the constant current control region to the constant power control region at an elapsed time t2.

As shown in Part (b) of FIG. 19, the lamp current Ila is reduced to the lamp current Ila1 lower than the current limit I0 for a time period between elapsed times t1, t2 after the lamp starts lighting while the lamp current Ila is controlled in order not to exceed the current limit I0 after the lighting start. In addition, as shown in Part (c) of FIG. 19, the operating frequency fa1 in this-time stable lighting mode is set up, and thereafter the operating frequency fa is set at the operating frequency fa2 higher than the operating frequency fa1 for the time period between the elapsed times t1, t2 after the lamp starts lighting while the lamp voltage Vla is rising after the lighting start.

In FIG. 19, the elapsed time t1 is set up as a time during the period when the lamp voltage Vla is rising after the lighting start. However, the time t1 may be set up as a timing when the switching elements Q2 to Q5 shift their switching frequencies from the higher ones at the start of operation to the lower ones at the start of lighting.

Furthermore, the elapsed time t2 is set equal to timing when the discharge lamp lighting device starts its constant power control, in n FIG. 19. However, the elapsed time t2 may be set equal to a time before or after, or equal to the timing when the discharge lamp lighting device starts its constant power control.

Additionally, timings when the lamp current Ila is changed are respectively set equal to timings when the operating frequency fa is changed, and vice versa, in FIG. 19. However, the timings may be respectively set different from each other. In other words, the elapsed times t1, t2 may be set up as those which are effective enough to suppress the rise of the lamp voltage Vla depending on the necessity.

As described above, the present embodiment makes it possible to optimally control the operating frequency fa and the lamp current Ila which are set up for the predetermined time period after the lamp starts lighting until reaching a stable lighting state, in consideration of the conditions in the previous stable lighting mode. In addition, the operating frequency fa for the predetermined time period is made higher than the operating frequency in the previous stable lighting mode, and concurrently the lamp current Ila for the predetermined time period is made smaller than the current limit I0 of the constant current control region. Thereby, the rise of the lamp voltage Vla after the lamp starts lighting until reaching a stable lighting state is suppressed. This enables expansion of the lifespan of the lamp. Moreover, a decrease in the lamp current due to the rise of the lamp voltage Vla does not occur in the constant power region, and accordingly the temperatures of the respective electrodes are not lowered. This enables suppression of the occurrence of arc jump. Furthermore, an excessive rise of the temperatures of the respective electrodes can be suppressed, because a length of a half time period of the lamp current 1*a* is made shorter whereas the lamp current Ila is reduced, in the current limit region. Consequently, the output from the power converting circuit can be optimally controlled in consideration of the history of the lighting conditions in the previous stable lighting mode, and therefore the rise of the lamp voltage Vla after the lamp starts lighting until reaching a stable lighting state can be suppressed. This enables expansion of the lifespan of the lamp and suppression of the occurrence of arc jump. Additionally, combination of the control of the operating frequency fa and the control of the lamp current Ila allows more lamp current Ila to flow and allows a speed at which the luminous flux rises to be secured.

Embodiment 4

In the case of embodiments 1 and 3, for the predetermined time period after the lamp starts lighting until reaching a stable lighting state, the operating frequency setter 41*a* makes the operating frequency fa higher than the operating frequency in the previous stable lighting mode on the basis of the lighting conditions which are stored in the memory 41*f* and in the previous stable lighting mode. In the present embodiment, a time period when the operating frequency fa is made lower than the operating frequency in the previous stable lighting mode is set up before the operating frequency fa is made higher than the operating frequency in the previous stable lighting mode. The time period immediately after the lighting start does not cause the rise of the lamp voltage Vla. For this reason, by reducing the operating frequency for this time period, it is possible to accelerate the rise of the temperatures of the respective electrodes, and accordingly to increase the speed at which the luminous flux rises. Descriptions will be hereinafter provided for first and second configurations each enabling this operation.

(First Configuration)

Figure 20:
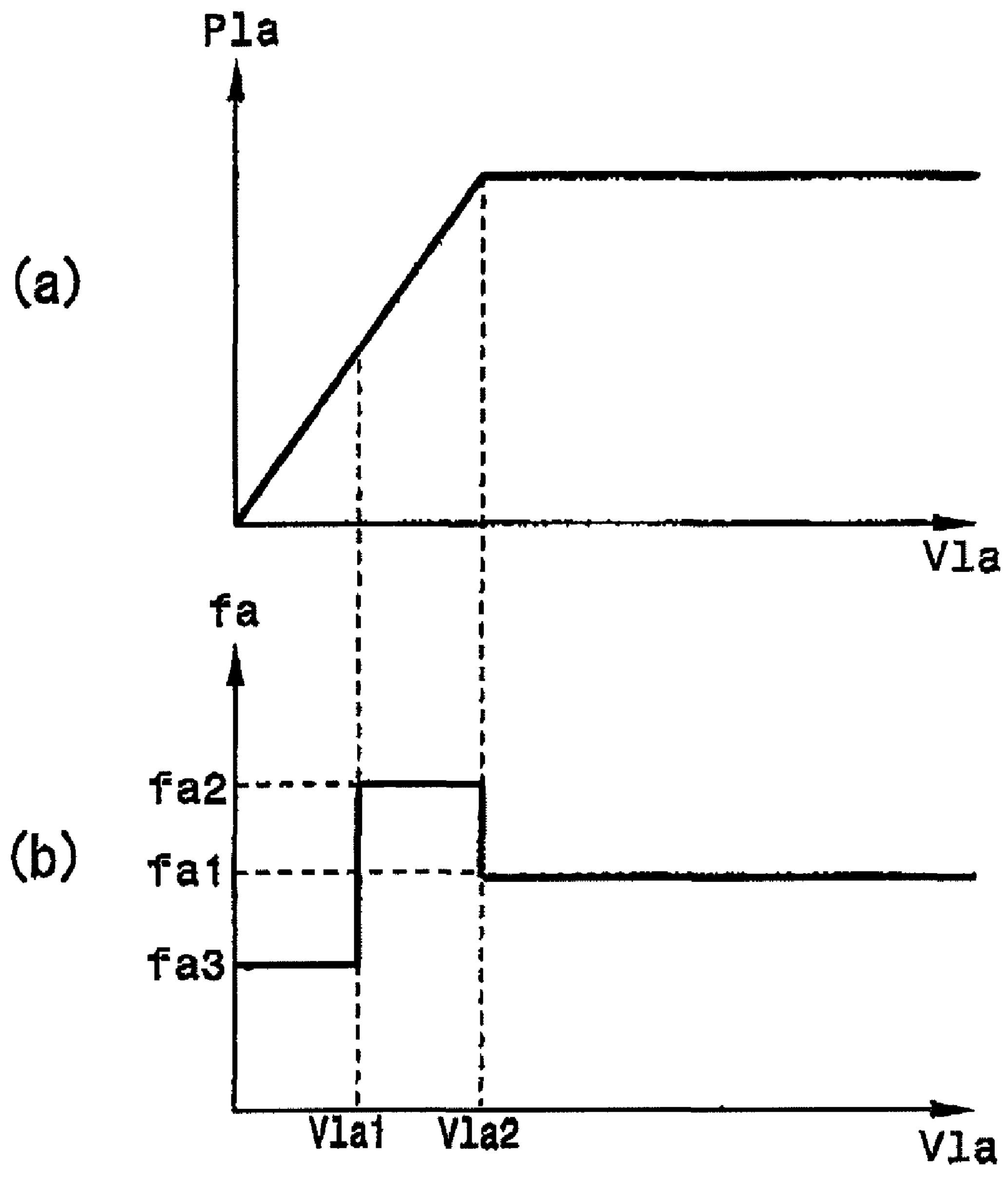
FIG. 20 Parts (a) and (b) of FIG. 20 are diagrams showing how to control an operating frequency according to a first configuration of Embodiment 4.

In the first configuration, an operating frequency fa for the predetermined time period is set up by using the second configuration which has been described with regard to Embodiment 1. FIG. 20 shows an example of how the control timings are set up according to a lamp voltage Vla. Note that Part (a) of FIG. 20 shows a relationship between the lamp voltage Vla and a lamp power Pla. The discharge lamp lighting device shifts from a constant current control region to a constant power control region at a lamp voltage Vla2.

As shown in Part (b) of FIG. 20, the operating frequency fa is set at an operating frequency fa3 lower than an operating frequency f0 in the previous stable lighting mode for a time period before the lamp voltage Vla=Vla1 where the lamp voltage Vla is rising after the lighting start. Subsequently, the operating frequency fa is set at an operating frequency fa2 higher than the operating frequency f0 in the previous stable lighting mode for a time period when the lamp voltage Vla=Vla1 to Vla2 while the lamp voltage Vla is further rising. Once the lamp voltage Vla=Vla2, the operating frequency fa is set at an operating frequency fa1 which is higher than the operating frequency fa3 but lower than the operating frequency fa2.

(Second Configuration)

Figure 21:
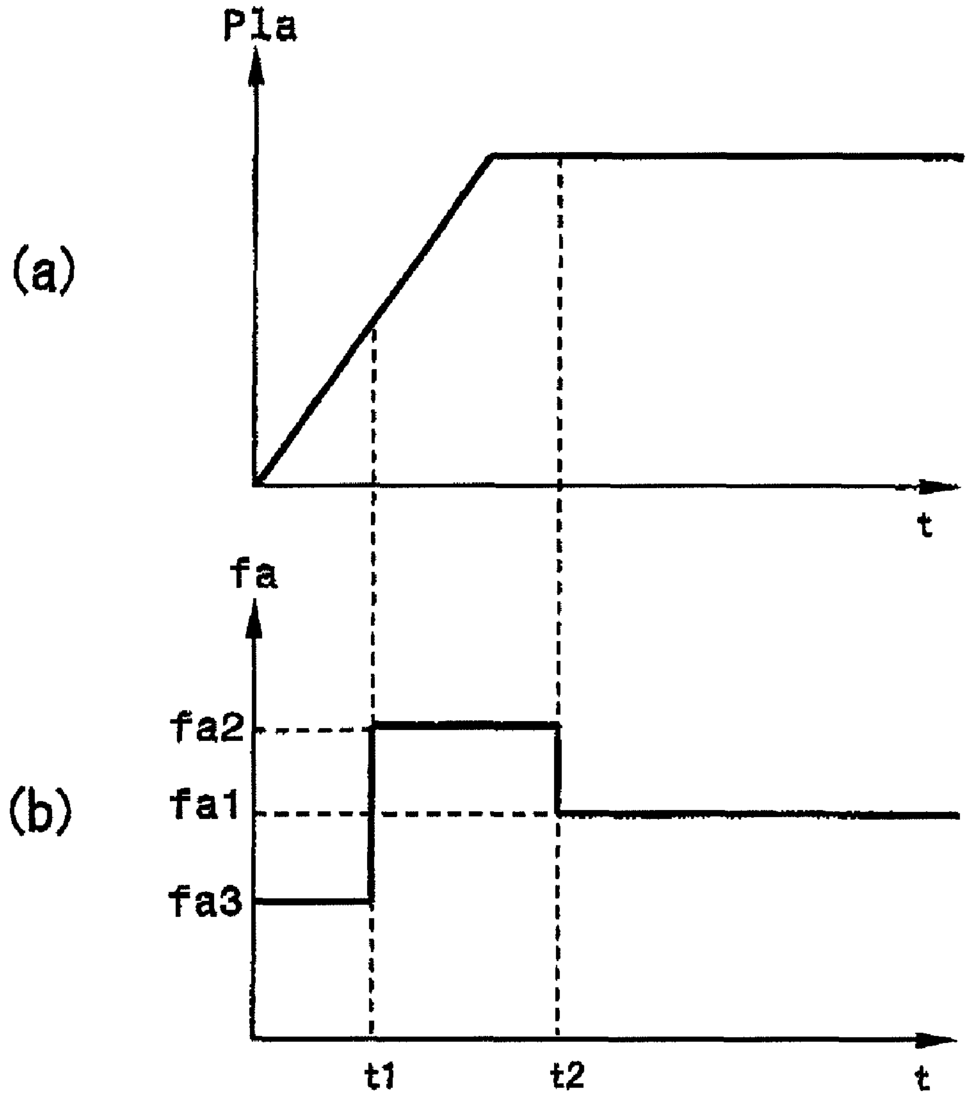
FIG. 21 Parts (a) and (b) of FIG. 21 are diagrams showing how to control an operating frequency according to a second configuration of Embodiment 4.

Using the third configuration which has been described with regard to Embodiment 1, the second configuration of the present embodiment sets up the operating frequency fa for the predetermined time period. FIG. 21 shows an example of how the control timings are set up on the basis of a time elapsed after the lamp starts lighting. Part (a) of FIG. 21 shows a relationship between the elapsed time t after the lamp starts lighting and the lamp power Pla. The discharge lamp lighting device shifts from a constant current control region to a constant power control region at elapsed time t2.

As shown in Part (a) of FIG. 21, for a time period until elapsed time t1 after the lamp starts lighting, the operating frequency is set at the operating frequency fa3 lower than the operating frequency f0 in the previous stable lighting mode. Subsequently, for a time period between the elapsed times t1, t2, the operating frequency fa is set at the operating frequency fa2 higher than the operating frequency f0 in the previous stable lighting mode. Thereafter, for a time period after the elapsed time t2, the operating frequency fa is set at the operating frequency fa1 which is higher than the operating frequency fa3 but lower than the operating frequency fa2.

Figure 22:
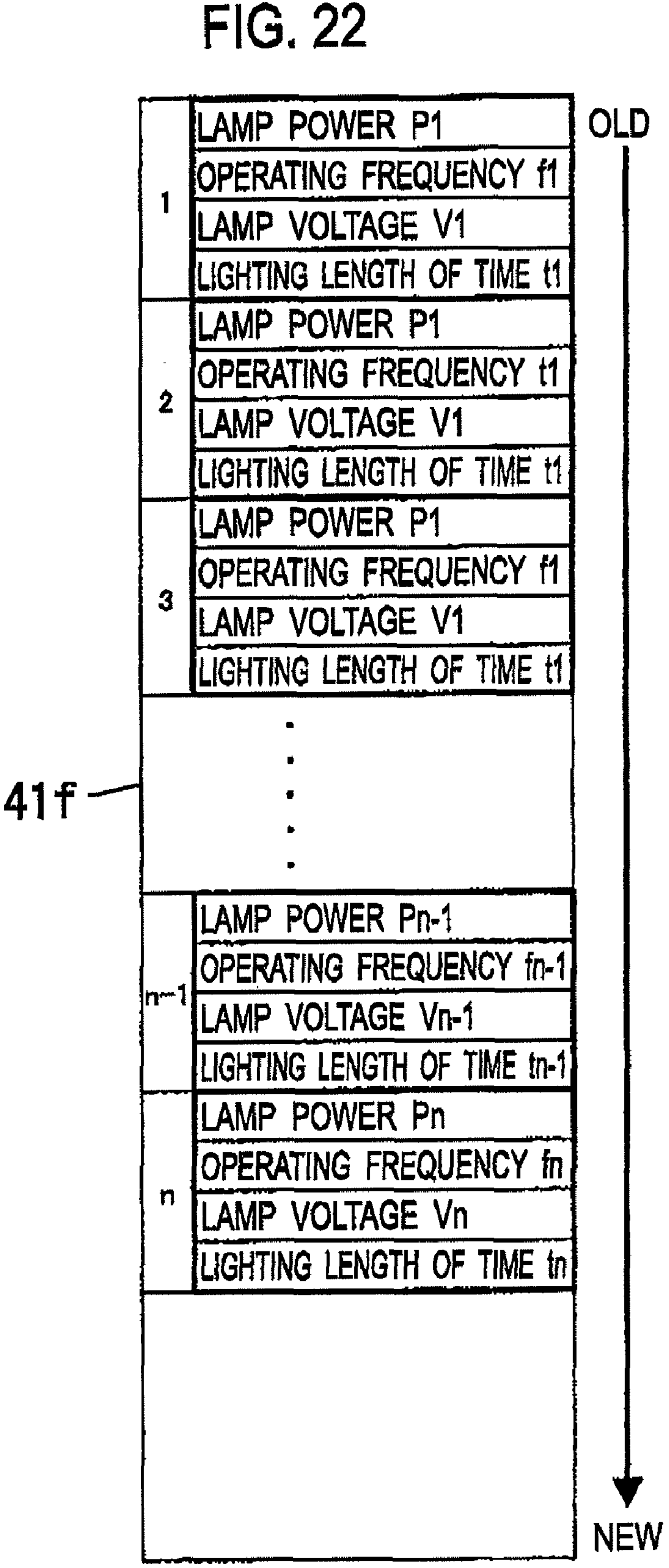
FIG. 22 is a diagram showing how data are stored in a memory.

Furthermore, a method of storing data in the memory **41*f* according to embodiments 1 to 4 is as shown in FIG. 22. A set of lighting conditions including the lamp power Pla, the lamp voltage Vla, the operating frequency fa and the lighting time length Ta is stored in the memory 41*f*. The next time the lamp is turned off, or the next time the lighting conditions are changed, the set of current lighting conditions is stored in the next area in the memory 41*f*. Consequently, in a case where the lighting time length in the previous set of lighting conditions is short, the second previous set of lighting conditions is referred to on the assumption that almost no change occurs in either of the electrodes of the discharge lamp La. Thereby, it is possible to optimally determine the lighting conditions with which the lamp should be lighted this time. Moreover, when the capacity of the memory 41*f* becomes small, the latest set of data may be written in the memory 41*f*** by deleting the set of data starting from the oldest. Through this scheme, it is possible to reduce the number of times the sets of data are rewritten.

Figure 23:
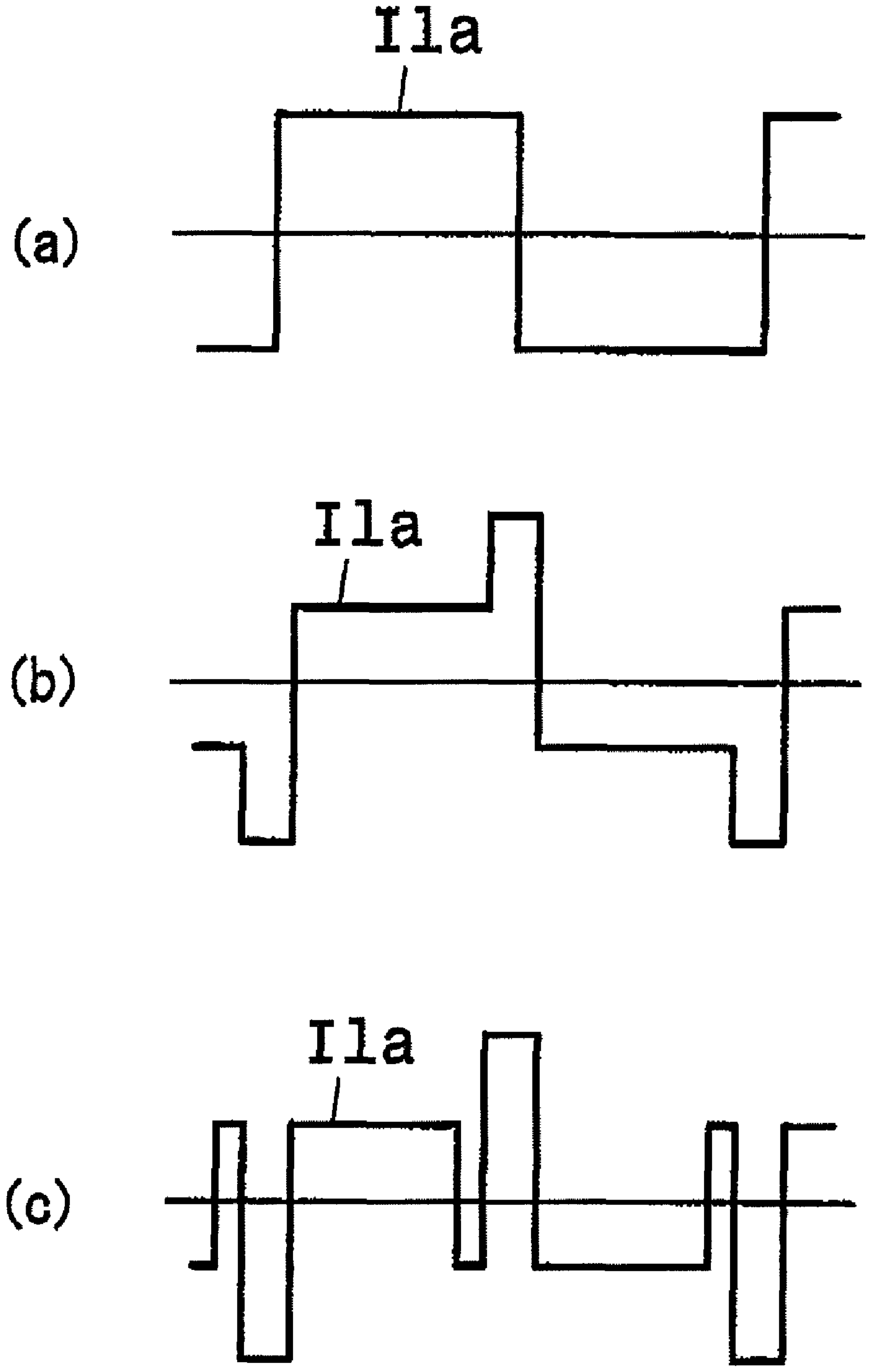
FIG. 23 Parts (a) to (c) of FIG. 23 are diagrams showing waveforms of lamp currents, respectively.

In general, the lamp current Ila is a rectangular wave as shown in Part (a) of FIG. 23. However, as shown in Part (b) of FIG. 23, the lamp current Ila may have a waveform in which the current value is temporarily increased in such a manner that a part of the rectangular waveform periodically inversing its polarity is raised to have a pulse shape just before the polarity is inversed. Alternatively, as shown in Part (c) of FIG. 23, the lamp current Ila may have a waveform in which the current value is temporarily increased in such a manner that a pulse waves are continuously formed in each cycle of the rectangular wave inversing its polarity.

Embodiment 5

Figure 24:
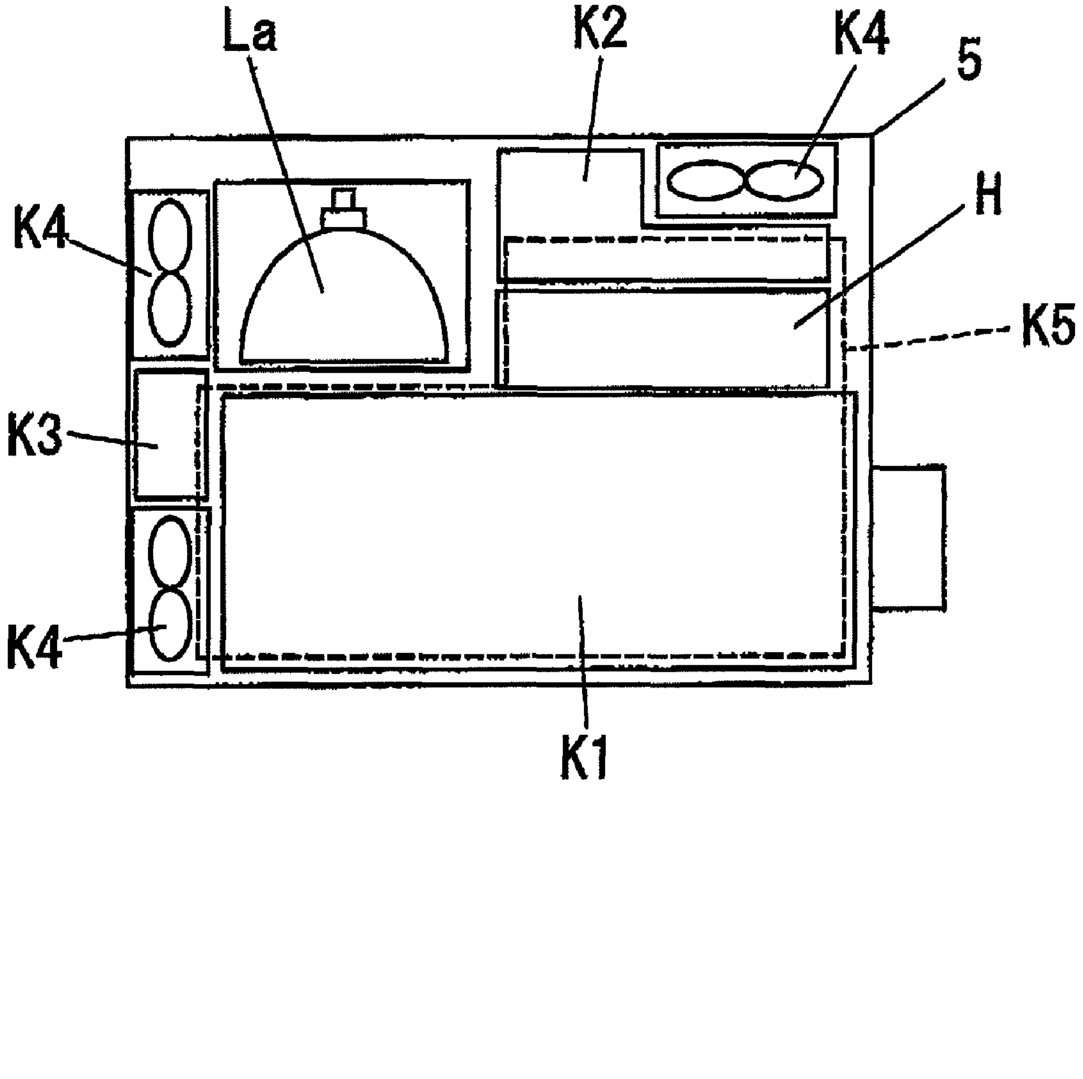
FIG. 24 is a diagram showing a configuration of an image displaying unit according to Embodiment 4.
Figure 25:
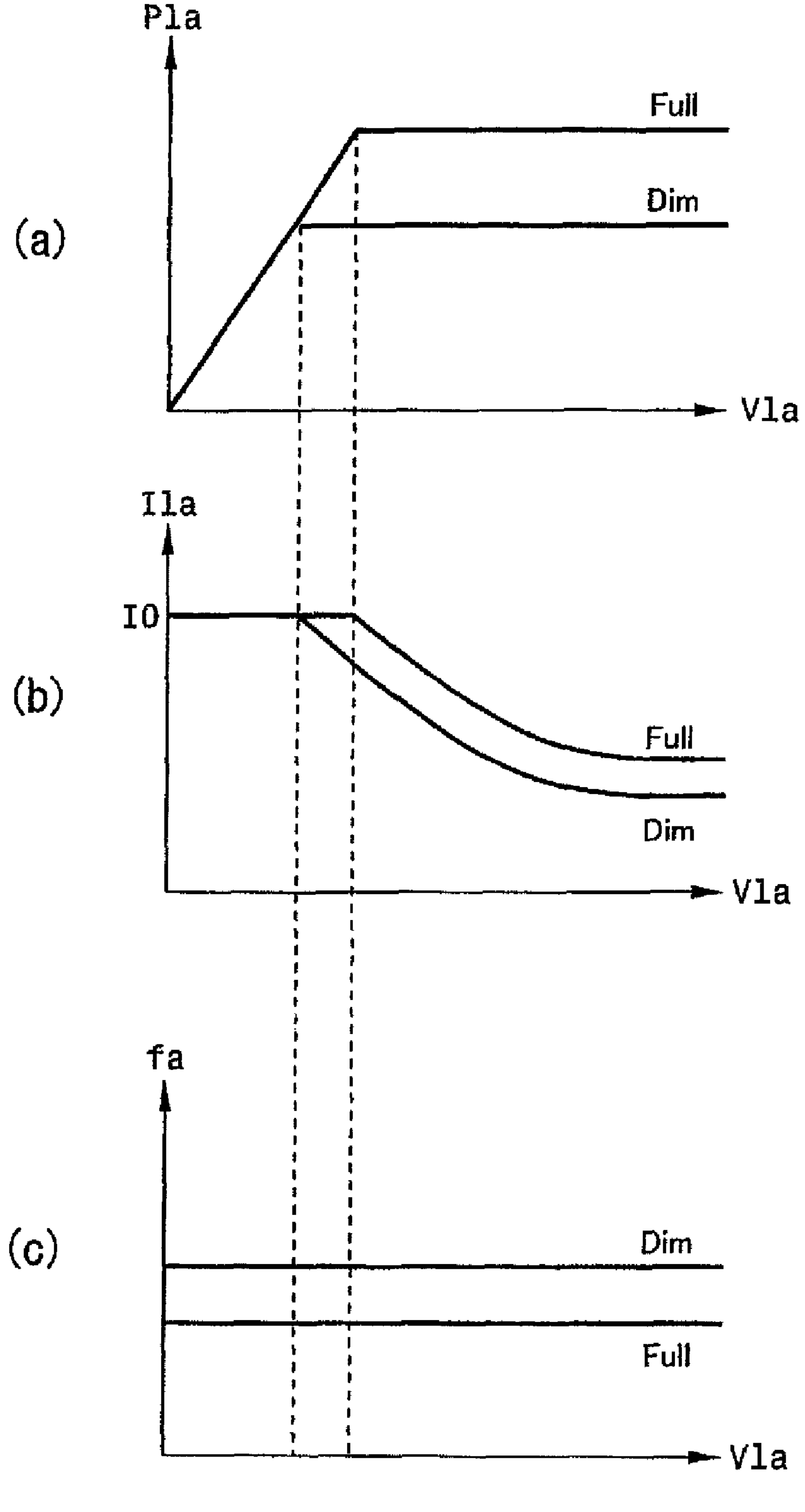
FIG. 25 PRIOR ART
FIG. 25 Parts (a) to (c) of FIG. 25 are diagrams showing how to control outputs to a lamp.

The present embodiment will be described as an image display apparatus using the discharge lamp lighting device according to any one of embodiments 1 to 4. FIG. 24 shows a configuration of the image display apparatus. The image display apparatus is configured by including, in its housing 5, the discharge lamp lighting device H according to any one of embodiments 1 to 4, the discharge lamp La formed of a ultrahigh-pressure mercury short-arc lamp whose lighting is controlled by the discharge lamp lighting device H, an optical device K1, a power supply K2, an external signal receiver K3, and three fans K4. The discharge lamp lighting device H, the optical device K1 and the power supply K2 are packaged on a main control substrate K5.

The optical device K1 is configured by including: means configured to transmit or reflect light from the discharge lamp La; and means configured to project the light thus transmitted or reflected through the aforementioned means onto a screen.

Use of the discharge lamp lighting device according to any one of embodiments 1 to 4 in the image display apparatus enables suppression of the rise of the lamp voltage after the lamp starts lighting until reaching a stable lighting state with consideration given to the lighting conditions in the previous stable lighting mode. Accordingly, the occurrence of arc jump is suppressed, so that the image quality is enhanced. In addition, the lifespan of each lamp is extended, so that the number of times lamps are changed is reduced.

INDUSTRIAL APPLICABILITY

The present invention brings about the following effects. The rise of the lamp voltage after the lamp starts lighting until reaching a stable lighting state is suppressed with consideration given to the history of the lighting conditions in the previous stable lighting mode. This enables expansion of the lifespan of the lamp and suppression of the occurrence of the arc jump.

The invention claimed is:

1. A discharge lamp lighting device comprising:

an electric power converting circuit configured to supply an alternating-current power to a discharge lamp by switching a switching element on and off;

a control circuit configured to control an output from the electric power converting circuit by controlling on and off of the switching element of the electric power converting circuit, and to shift the output control of the electric power converting circuit from a current limit region to a constant electric power control region after the discharge lamp starts to be lighted, a lamp current being controlled not to exceed a current limit in the current limit region, and a lamp electric power being controlled to remain constant in the constant electric power region; and a storage that stores a history of the output from the electric power converting circuit in a previous stable lighting mode of the discharge lamp, wherein, on the basis of the history stored in the storage, the control circuit suppresses a rise of a lamp voltage by changing the output from the electric power converting circuit in a predetermined time period, the predetermined time period being within a time period after the discharge lamp starts to be lighted until the discharge lamp enters a stable lighting mode, and shorter than the time period, wherein the control circuit temporarily changes a setting value of the output from the electric power converting circuit in the predetermined time period to a value that is determined according to the stored history of the output from the electric power converting circuit in the previous stable lighting mode, wherein on the basis of the history stored in the storage, the control circuit sets an operating frequency of the discharge lamp in the predetermined time period to be higher than an operating frequency in the previous stable lighting mode, wherein the control circuit generally maintains a constant operating frequency calculated on the basis of the history stored in the storage, in the predetermined time period, and wherein the predetermined time period is a time period in which the lamp voltage is between a first voltage and a second voltage, while the lamp voltage is rising after the discharge lamp starts to be lighted, the second voltage being greater than the first voltage, wherein the second voltage is set at a lamp voltage with which the output control of the electric power converting circuit is shifted to the constant electric power control region.

2. The discharge lamp lighting device according to claim 1, wherein, on the basis of the history stored in the storage, the control circuit sets a root-mean-square value of the lamp current output from the electric power converting circuit in the predetermined time period to be smaller than the current limit of the current limit region.

3. The discharge lamp lighting device according to claim 2, wherein the control circuit generally maintains the root-mean-square value of the lamp current output from the electric power converting circuit, in the predetermined time period, to be a constant value calculated on the basis of the history stored in the storage.

4. The discharge lamp lighting device according to claim 1, wherein the control circuit sets a time period during which the operating frequency of the discharge lamp is lower than the operating frequency in the previous stable lighting mode, before the operating frequency of the discharge lamp is made higher than the operating frequency in the previous stable lighting mode.

5. An image display apparatus comprising:

the discharge lamp lighting device according to claim 1;

the discharge lamp configured to be lighted by the discharge lamp lighting device; and an optical system configured to transmit or reflect light from the discharge lamp, and to project the transmitted light or the reflected light onto a screen.

* * * * *